(12) United States Patent
Matsumoto et al.

(10) Patent No.: US 8,285,749 B2
(45) Date of Patent: Oct. 9, 2012

(54) COMPUTER SYSTEM AND RECORDING MEDIUM

(75) Inventors: Shinya Matsumoto, Yokohama (JP); Etsutaro Akagawa, Kawasaki (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 12/681,946

(22) PCT Filed: Mar. 5, 2010

(86) PCT No.: PCT/JP2010/001563
§ 371 (c)(1),
(2), (4) Date: Apr. 7, 2010

(87) PCT Pub. No.: WO2011/108030
PCT Pub. Date: Sep. 9, 2011

(65) Prior Publication Data
US 2012/0005233 A1    Jan. 5, 2012

(51) Int. Cl.
*G06F 17/30* (2006.01)
(52) U.S. Cl. ............ 707/790; 707/797; 707/809
(58) Field of Classification Search ............ 707/790, 707/797, 809
See application file for complete search history.

(56) References Cited

U.S. PATENT DOCUMENTS

| | | | |
|---|---|---|---|
| 6,256,031 B1* | 7/2001 | Meijer et al. | 715/854 |
| 6,356,915 B1 | 3/2002 | Chtchetkine et al. | |
| 7,072,912 B1* | 7/2006 | Verma et al. | 1/1 |
| 7,225,211 B1 | 5/2007 | Colgrove et al. | |
| 7,480,789 B1* | 1/2009 | Donlin et al. | 713/1 |
| 7,937,453 B1* | 5/2011 | Hayden et al. | 709/219 |
| 2002/0095416 A1 | 7/2002 | Schwols | |
| 2002/0184184 A1* | 12/2002 | Holcomb | 707/1 |
| 2003/0110188 A1* | 6/2003 | Howard et al. | 707/200 |
| 2003/0115218 A1* | 6/2003 | Bobbitt et al. | 707/200 |
| 2004/0230599 A1 | 11/2004 | Moore et al. | |
| 2006/0010169 A1 | 1/2006 | Kitamura | |
| 2006/0123062 A1* | 6/2006 | Bobbitt et al. | 707/200 |
| 2008/0091638 A1 | 4/2008 | Suzuki | |
| 2010/0192207 A1* | 7/2010 | Raleigh | 726/6 |

FOREIGN PATENT DOCUMENTS

| WO | 2004/025404 A2 | 3/2004 |
|---|---|---|
| WO | 2004/107151 A1 | 12/2004 |

* cited by examiner

*Primary Examiner* — Hanh Thai
(74) *Attorney, Agent, or Firm* — Mattingly & Malur, PC

(57) ABSTRACT

A computer system comprising storage devices having different characteristics, a client computer, and a file access controller managing the storage devices with the HSM is disclosed. The file access controller provides a normal directory tree and a virtual directory tree, according to the configuration, and provides a first file stored in a first storage device through the normal directory tree and the virtual directory tree. And, the file access controller switches providing of a second file stored in a second storage device, depending on a used directory tree, which is used by the at least one client computer, and which is the normal directory tree or the virtual directory tree. Examples of the switch are about accessibility of the second file and recall processing of the second file.

14 Claims, 18 Drawing Sheets

FIG. 16
(a)
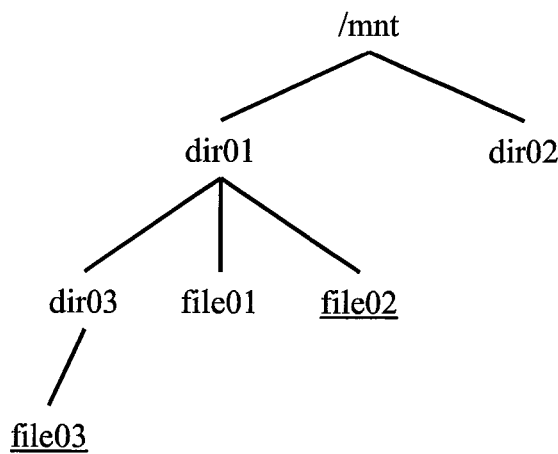
(b)
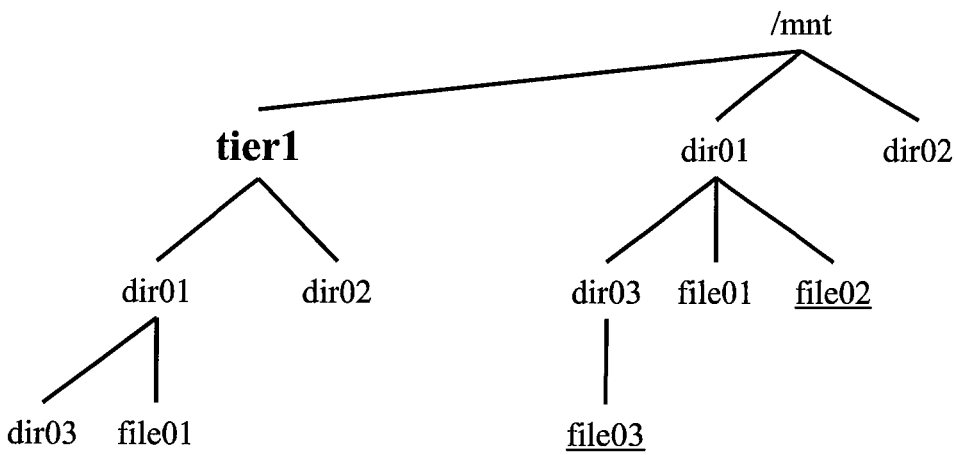

COMPUTER SYSTEM AND RECORDING MEDIUM

TECHNICAL FIELD

The present invention relates to a computer system and recording medium.

BACKGROUND ART

A hierarchical storage management (HSM) for efficiently utilizing the storage capacity of a file system (Patent Document 1) has been well known. The HSM means control for storing file data by using a combination of a plurality of storage devices with different performances, capacities and/or reliability. Focusing on the performances and capacities, the HSM uses at least two types of storage devices: a high-speed storage device with better performance than that of a low-speed storage device described hereinafter, and a low-speed storage device with a lower unit price per capacity than that of the high-speed storage device mentioned above. Note that the unit price per capacity is value obtained by dividing the storage capacity of each storage device by the price of the storage device. Hereinafter, the storage capacity is often referred to simply as "capacity." Examples of the performances include response time and transfer speed. The plurality of storage devices form groups based on the performances and the unit price per capacity, and each of the groups is called "tier." For example, a group that is configured by the storage devices with performances higher than a certain standard is often called "higher level tier," and a group that is configured by the storage devices with unit price per capacity lower than a certain standard is often called "lower level tier."

In the HSM, file data received from a client computer is first stored in the higher level tier. Thereafter, the shortage of the capacity of the higher level tier with high performance and unit price per capacity is alleviated by specifying a file, the last access time (e.g., creation time, update time, reference time) of which is earlier than the current time by at least a predetermined time period, and moving the specified file to the lower level tier. Note that this movement of a file from the higher level tier to the lower level tier is often called "tier descent movement," and the predetermined time period mentioned above is often called "tier descent base time period." Generally, when the file data is referenced or updated, the usage frequency thereof tends to decline as the time elapses since the creation time of the file data. For this reason, when moving a file according to the access time as described above, a file with a low reference frequency is expected to be moved from the higher level tier to the lower level tier.

Note that "time" described in the present specification may include information such as the year, month and date, or may be expressed in a form other than "year, month, date, hour, minute, second," as long as the time elapsed since a predetermined base can be expressed. For example, on the basis of "0 hour 0 minute 0 second on January 1, year 0," the time may be expressed in seconds, or in counters, such as several microseconds, several milliseconds, and seconds as in a general computer, on the basis of "0 hour 0 minute 0 second on Jan. 1, 1970."

Note that examples of the types of access to the files in the present specification include file generation, data addition, data update, data reference, and file deletion, and may also include other file operations as the types of access. Note that the types of access may not necessarily include all of the above examples, because some models of file storage systems purposefully prohibit or do not implement the operations such as file deletion and file update.

A stub file is used in order to easily refer to the file data moved from the higher level tier to the lower level tier (Patent Document 2). The stub file is disposed in the higher level tier. The stub file is the information for indicating a place in the lower level tier for storing the file data moved to the lower level tier. A user can refer to the file data moved to the lower level tier, by referring to the stub file stored in the higher level tier. Due to this stub file, a path name designated by the client computer when the stub file is stored in the higher level tier remains unchanged even after the file data is moved to the lower level tier. The path name is not changed also before and after performing a recall process on a file that is subjected to the recall process.

There is also known a technology for using metadata of a file to generate a virtual view for providing the user with files and directories using a variety of views (Patent Document 3).

CITATION LIST

Patent Literature

[PTL 1]
U.S. Pat. No. 7,225,211
[PTL 2]
WO2004/025404
[PTL 3]
WO2004/107151

SUMMARY OF INVENTION

Technical Problem

Incidentally, in some cases, for example, a process for creating a search index, a process for inspecting the presence/absence of a computer virus, or a process for creating a backup is performed on a plurality of files stored in a file storage system. These processes are executed repeatedly. Mainly for the files under a directory determined every time these processes are executed, a file that needs to be subjected to data check is specified based on the name and time information of the file, and the data of the file are checked (in some cases, specifying the file is omitted, and the data check is performed mainly on all of the files under the determined directory). Note that such the process with such features is called "crawling process" in the following description.

However, when the crawling process and HSM are combined, various resources in the file storage system are wasted due to the access tendency in the crawling process. The following are the major examples of the various resources that are wasted. Note that not all of the following examples become problems, but sometimes only one of the examples becomes a problem.

(Example 1: The capacity of a storage device in the higher level tier is wasted) Because the file is referenced or updated in the crawling process, last access time information of the file is changed. Therefore, when the crawling process is applied to a file managed by means of HSM, wasting of the capacity of the storage device occurs if the higher level tier has the files that are not used much frequently by a program or client computer accessing the file during a process other than the crawling process. Note that the program (or client computer) that creates or updates the file stored in the files storage system is usually the program (or client computer) that accesses the file during the process other than the crawling process.

The program (or client computer) executes the crawling process at a one-week or one-month interval. Thus, at this interval, a program (or client computer) that does not perform the crawling process accesses a file that was not accessed at all or at significant frequency, and the accessed file is moved to the higher level tier in the recall process each time the abovementioned file is accessed. As a result, the file which is not used much frequently by the program (or client computer) that does not perform the crawling process is stored in the higher level tier. In a case in which the file storage system detects the shortage of the capacity of the higher level tier, if a file, whose last access time is not earlier than the current time by the abovementioned tier descent reference time period, is subjected to tier descent movement, a file that is accessed at high frequently by the program that does not perform the crawling process is subjected to the tier descent movement and moved to the lower level tier as a result of the recall process on the file accessed during the crawling process, whereby access performance is degraded.

(Example 2: Process resources or network resources are wasted due to transmission of information of a file that does not need to be subjected to the crawling process) The crawling process tends to have many processing contents that should be carried out when creating or updating files. For example, when the example of the crawling process is a process for updating an index of a file, the data of a file that is not updated does not need to be referenced for updating the index. On the other hand, when the example of the crawling process is a process for moving a file, which is not accessed for a certain time period, to a tape or a sequential access storage medium, it is not necessary to provide a file that has a new reference time, as a file to be subjected to the crawling process.

However, when the program (or client computer) performing the crawling process and the program (or client computer) that does not perform the crawling process employ the same file access protocol, both the file having the file data stored in the higher level tier and the file having the file data stored in the lower level tier become accessible. Therefore, the abovementioned file that is not updated and the abovementioned file that has a new reference time are also subjected to the crawling process, or the information on the names or attributes of these files need to be referenced in the crawling process.

An object of the present invention, therefore, is to provide a file storage system that is provided with HSM appropriate for accessing files in the crawling process. In one of the perspectives embodying this object, the present invention aims to provide a computer system that disperses a plurality of files to a plurality of file systems and manages the dispersed files, as well as a storage medium, the computer system being able to access only a file existing in a designated file system, relatively easily. In another one of the perspectives embodying the object mentioned first, the present invention aims to provide a computer system and recording medium that can be used without changing the configurations of an external application program, by providing a directory tree in which the file system programs carry out different operations, and to provide a storage medium. A further object of the present invention will be understood from the description of the embodiments below.

Solution to Problem

In order to achieve the objects described above, A computer system comprising storage devices having different characteristics, a client computer, and a file access controller managing the storage devices with the HSM is disclosed. The file access controller provides a normal directory tree and a virtual directory tree, according to the configuration, and provides a first file stored in a first storage device through the normal directory tree and the virtual directory tree. And, the file access controller switches providing of a second file stored in a second storage device, depending on a used directory tree, which is used by the at least one client computer, and which is the normal directory tree or the virtual directory tree. Examples of the switch are about accessibility of the second file and recall processing of the second file.

Note that the scope of the present invention includes another combination of the aspects described above.

BRIEF DESCRIPTION OF DRAWINGS

FIG. 16 is a schematic diagram showing a difference in appearance between a normal directory and the virtual directory.

DESCRIPTION OF EMBODIMENTS

Embodiments of the present invention are described hereinafter with reference to the drawings. As will be described later, in a file storage system provided with HSM, the present invention can obtain only a file that has file data stored in a desired tier, as an access target. In the present invention, therefore, a virtual directory can be set separately from a normal directory. In the virtual directory, only a file that actually has file data stored in a designated tier (actual file) can be accessed. In the virtual directory, control is carried out so that a recall process is not generated regardless of whether a stub file that is not stored in the designated tier is displayed or not.

Figure 1:
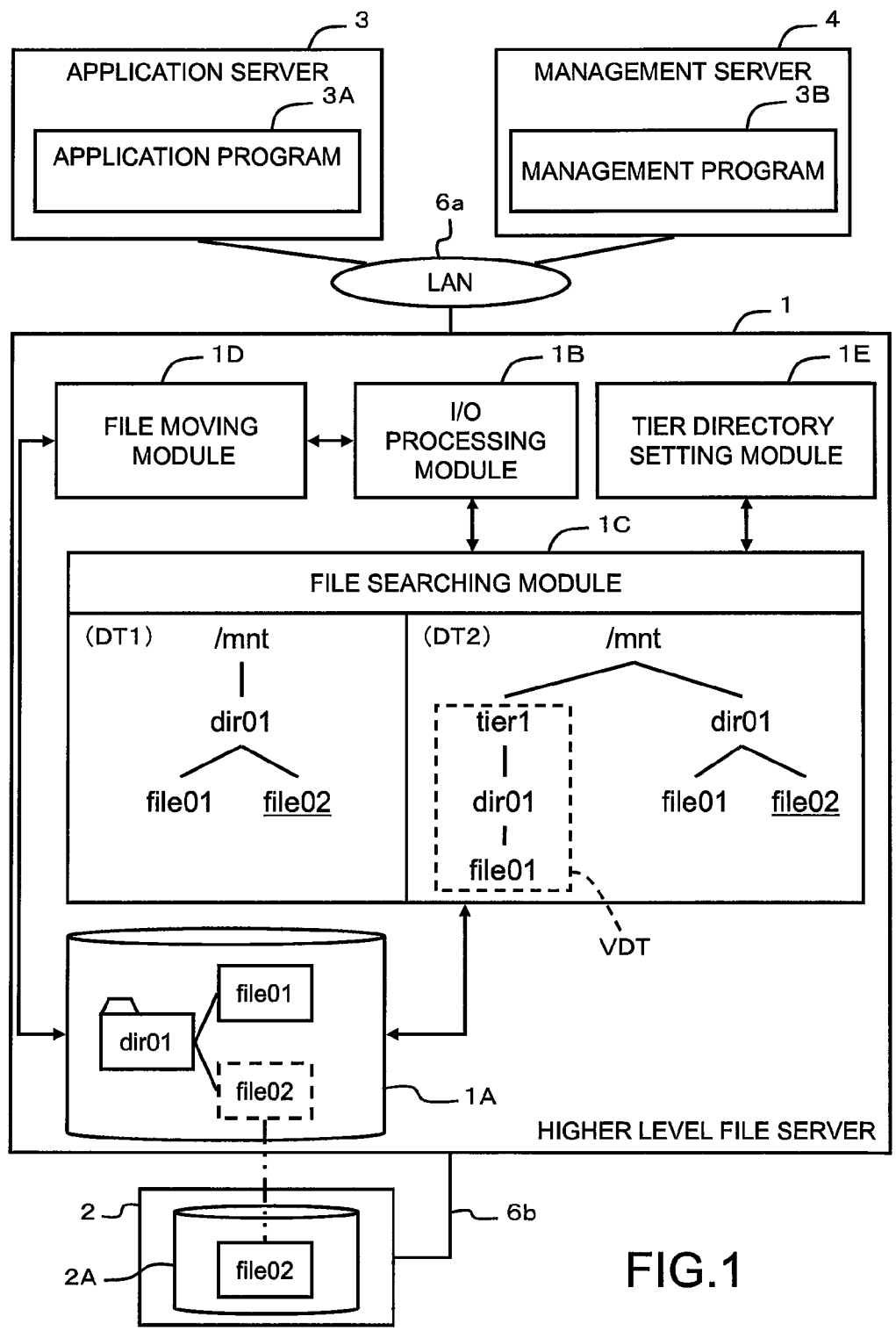
FIG. 1 is a diagram showing an outline of an embodiment.

FIG. 1 is an explanatory diagram showing the entire outline of the present embodiment. FIG. 1 is illustrated clearly enough to understand or implement the present invention. The scope of the present invention is not limited to the configuration illustrated in FIG. 1. The features that are not illustrated in FIG. 1 will become clear in the following embodiments.

A computer system has, for example, a higher level file server 1, a lower level file server 2, an application server 3, and a management server 4. As will be described using FIG. 2, the computer system can also have a user computer 50 (equivalent to the client computer mentioned above).

A communication configuration is described first. The higher level file server 1, the application server 3 and the management server 4 are coupled to one another via a first communication network 6a so as to be mutually communicable with one another. The higher level file server 1 and the lower level file server 2 are coupled to each other via a second communication network 6b so as to be mutually communicable with each other. The first communication network 6a and the second communication network 6b are configured in the form of, for example, a LAN (Local Area Network). The first communication network 6a can be referred to as "higher level communication network," and the second communication network 6b "lower level communication network."

A communication network within the computer system is divided into the first communication network 6a and the second communication network 6b so that the data communication between the file servers 1, 2 and the I/O (Input/Output) communication between the application server 3 or the like and the higher level file server 1 can be divided. However, the communication configuration is not limited to the one shown in FIG. 1, and therefore each of the file servers 1, 2, the application server 3 and the management server 4 may be coupled to one another via a single communication network without dividing the communication network into the first communication network 6a and the second communication network 6b.

Note that a first volume 1A of the higher level file server 1 and a controller of the higher level file server 1 (a controller 11 shown in FIG. 2) are coupled to each other via a communication network, such as a SAN (Storage Area Network). Similarly, a controller of the lower level file server 2 (a controller 21 shown in FIG. 2) and a second volume 2A of the lower level file server 2 are coupled to each other via a communication network, such as a SAN, so as to be mutually communicable with each other.

The application server 3 and the management server 4 are now described. The application server 3 is an example of "client computer." The application server 3 has an application program 3A. Examples of the application program 3A include a program for creating a search index, a program for cleaning the computer viruses, and a program for creating backups of files.

The management server 4 has a management program 4A for managing the setting of the file server 1. The management server 4 or the management program 4A can be referred to as, for example, "management device managing the setting of a file server device" or "management means." The number of an accessible tier can be set in the higher level file server 1 by using the management program 4A.

The higher level file server 1 and the lower level file server 2 correspond to an example of the "file server device." The higher level file server 1 is a file server that unifies a plurality of file server and receives access from the application server 3, the management server 4 or the user computer. Note that the lower level file server 2 may deny or block access from the application server 3, the management server 4 or the user computer.

Although FIG. 1 shows the two file servers of the higher level file server 1 and the lower level file server 2, the con-figuration is not limited thereto and therefore may be provided with three or more file servers. In this case well, the higher level file server 1 unifies and manages the other file servers and process a file access request on behalf of the other file servers.

The higher level file server 1 has, for example, the first volume 1A, an input/output processing module 1B (I/O processing module in the diagram), a file searching module 1C, a file moving module 1D, and a tier directory setting module 1E. The input/output processing module 1B, the file searching module 1C, the file moving module 1D and the tier directory setting module 1E are the functions of the file system program possessed by the higher level file server 1. Note that each module may be a physical device, a part of a software program, or a combination thereof.

The first volume 1A, an example of the "first storage device," is generated as a relatively high-speed logical volume. The second volume 2A of the lower level file server 2 is an example of the "second storage device" and generated as a relatively low-speed logical volume. Each of the volumes 1A, 2A can be generated using, for example, a hard disk device, semiconductor memory device, optical disk device, magneto optical disk drive, magnetic tape device, flexible disk device, and various other physical storage devices capable of reading/writing data.

When using a hard disk device, for example, an FC (Fibre Channel) disk, SCSI (Small Computer System Interface) disk, SATA disk, ATA (AT Attachment) disk, SAS (Serial Attached SCSI) disk, or the like can be used. When using a semiconductor memory device, for example, a flash memory, FeRAM (Ferroelectric Random Access Memory), MRAM (Magnetoresistive Random Access Memory), phase-change memory (Ovonic Unified Memory), RRAM (Resistance RAM), PRAM (Phase-change RAM), and various other memories can be used.

The first volume 1A and the second volume 2A may be generated using different physical storage devices respectively. For example, the first volume 1A can be generated using a storage region of a flash memory device, and the second volume 2A can be generated using a storage region of a hard disk device. Similarly, the first volume 1A and the second volume 2A may adopt the RAID level or parity group configurations that are different from each other.

The higher level file server 1 is now described again. The input/output processing module 1B functions to process a file access request issued by the application server 3 or the user computer. The input/output processing module 1B processes a file discovered by the file searching module 10. The file searching module 10 is a function of searching for a file stored in the first volume 1A or the second volume 2A, by a look-up process described later (see FIGS. 9 and 10).

The file moving module 1D functions to move the file between the first volume 1A and the second volume 2A. For example, the file moving module 1D selects, out of a plurality of files store in the first volume 1A, a file with a low usage frequency as a movement target file. A file, whose last access time is earlier than the current time by a predetermined time period, can be considered the file with a low usage frequency.

The file moving module 1D copies the movement target file, from the first volume 1A to the second volume 2A, and thereafter deletes the movement target file within the first volume 1A. In the present specification, the process for moving file data from a movement source volume to a movement destination volume, deleting the file data of the movement source volume, and leaving the file data in the movement destination volume only is called "movement of a file." In FIG. 1, "file02" is the movement target file.

The file moving module 1D creates a stub file corresponding to the movement target file that is moved to the second volume 2A. The file moving module 1D stores the stub file in the first volume 1A, instead of storing the movement target file.

The stub file is an example of "storage destination information file." The stub file is the information indicating a predetermined attribute, such as a storage destination of the movement target file and a file name. The file data of a file in which the stub file is created is stored in a tier indicated by the stub file. In FIG. 1, the "file02" enclosed in a dotted line within the first volume 1A is the stub file. A file that is an entity of the "file02" (to be also referred to as an actual file) exists within the second volume 2A of the lower level file server 2. Note that generally the stub file does not at all contain the file data, but may include part of the file data. In the following description, a file in which a stub file is generated and whose file data is stored in a tier other than the higher level tier is often called "stubbed file."

Note that the file name means the name of a file. The file name is not unique in the file system but is unique within a parent directory to which the file belongs. Similarly, a directory name means the name of a directory. The directory name is not unique within the file system but is unique within the parent directory.

When a request for access to the stub file within the first volume 1A is generated, the file moving module 1D detects the location of the actual file based on information recorded in the stub file. The file moving module 1D copies the detected actual file from the second volume 2A to the first volume 1A. The input/output processing module 1B carries out a predetermined process on a file copied back from the second volume 2A to the first volume 1A.

The file moving module 1D moves a file, which has not been accessed recently, to the second volume 2A and moves a file, which has been accessed recently (or which is to be accessed), to the first volume 1A, as described above. As a result, files that are likely to be accessed in the future are stored in the first volume 1A, and the first volume 1A is used efficiently.

The stub file corresponding to the file moved to the second volume 2A is stored in the first volume 1A. Thus, even when moving a file from the first volume 1A to the second volume 2A, a name space of the first volume 1A can be maintained. The name space is a collection of unique names and identifiers (corresponding to path names described later) that are designated by the user computer when accessing the files stored in the file storage system. When the plurality of files can be hierarchized by introducing a directory (synonym of "folder") that is introduced for easily managing a plurality of files, and by virtually including files and another directory into this directory, the name space that uses the name of this directory as a part of a path name is often called "directory tree."

As described above, the client computer can access files without being aware of an actual storage tier of the files. In other words, the application program 3A that is activated on the client computer cannot distinguish the actual place to store each file.

Therefore, the user cannot carry out a specific process only on a group of files within the first volume 1A. For example, when the application program 3A is a program creating the search index, the search index cannot be created for only a file stored in the first volume 1A.

When the application program 3A transmits an access request to the stubbed file, the file storage system executes the recall process in response to the access request, thereby moving file data of a target file from the second volume 2A to the first volume 1A. When the recall process for moving the file from the second volume 2A to the first volume 1A occurs frequently, the load on each of the file servers 1, 2 increases. Moreover, because a large number of files are copied to the first volume 1A, the free space on the first volume 1A decreases. In some cases the free space on the first volume 1A becomes zero.

For this reason, the higher level file server 1 of the present embodiment is provided with the tier directory setting module 1E. The tier directory setting module 1E sets a virtual directory that can access only a file belonging to a designated tier. The high-speed first volume 1A can be referred to as "higher level tier," "first tier," or "high-speed tier." The low-speed second volume 2A can be referred to as "lower level tier," "second tier," or "low-speed tier."

Two directory trees are shown below the file searching module 1C. The directory tree DT1 on the left side is a normal directory tree, an example of "first directory tree." The directory tree DT2 on the right side is a special directory having a virtual directory tree (a directory tree with the virtual directory tree at the top), and is an example of "second directory tree."

The first directory tree DT1 includes a file that is actually stored in the first volume 1A (file01) and the stubbed file (file02). In other words, the first directory tree DT1 displays a directory tree that includes the identifiers of all of the files in which the file data are stored in any of the all of the tiers (to be referred to as "integrated directory").

The second directory tree DT2, on the other hand, has a virtual directory tree VDT in addition to the directory tree of the first volume 1A. The virtual directory tree VDT starts with a virtual directory "tier1." The directory name of the virtual directory "tier1" indicates a tier designated from the management server 4. The "tier1" indicates a first tier provided by the first volume 1A.

For example, when the virtual directory tree VDT is associated with the higher level tier, only the file whose file data is stored in the higher level tier (file01) is included, and a different tier, that is, the stubbed file (file02), is removed from the virtual directory tree VDT. The user therefore can designate a process target range by using the virtual directory tree VDT, and cause the application program 3A to carry out a process without causing the recall process.

For example, the application program 3A can process only the file that is actually stored in the first volume A1, by designating a directory or file under the virtual directory tree VDT associated with the higher level tier. In this instance, the recall process is not performed because no access to the stubbed file occurs.

According to the present embodiment configured as above, the operation of the file system program is different between the normal directory tree DT1 and the virtual directory tree VDT. In the virtual directory tree VDT, access is possible only to a file that actually belongs to a designated tier. Therefore, the application program 3A can access mainly the files in which the file data are stored in a tier set by a manager of the file storage system, without being aware of the tier in which the file data of the file are actually stored. Moreover, in the present embodiment, a range desired by the manager of the file storage system can be processed without changing the program of the application program 3A, improving the usability of the application program 3A. Moreover, because unwanted recall process is not performed, the load on each of the file servers 1, 2 can be prevented from increasing, and the free space of the first volume 1A can be prevented from being reduced by copying an unwanted file. The present embodiment is described hereinafter in detail.

Embodiment 1

Figure 2:
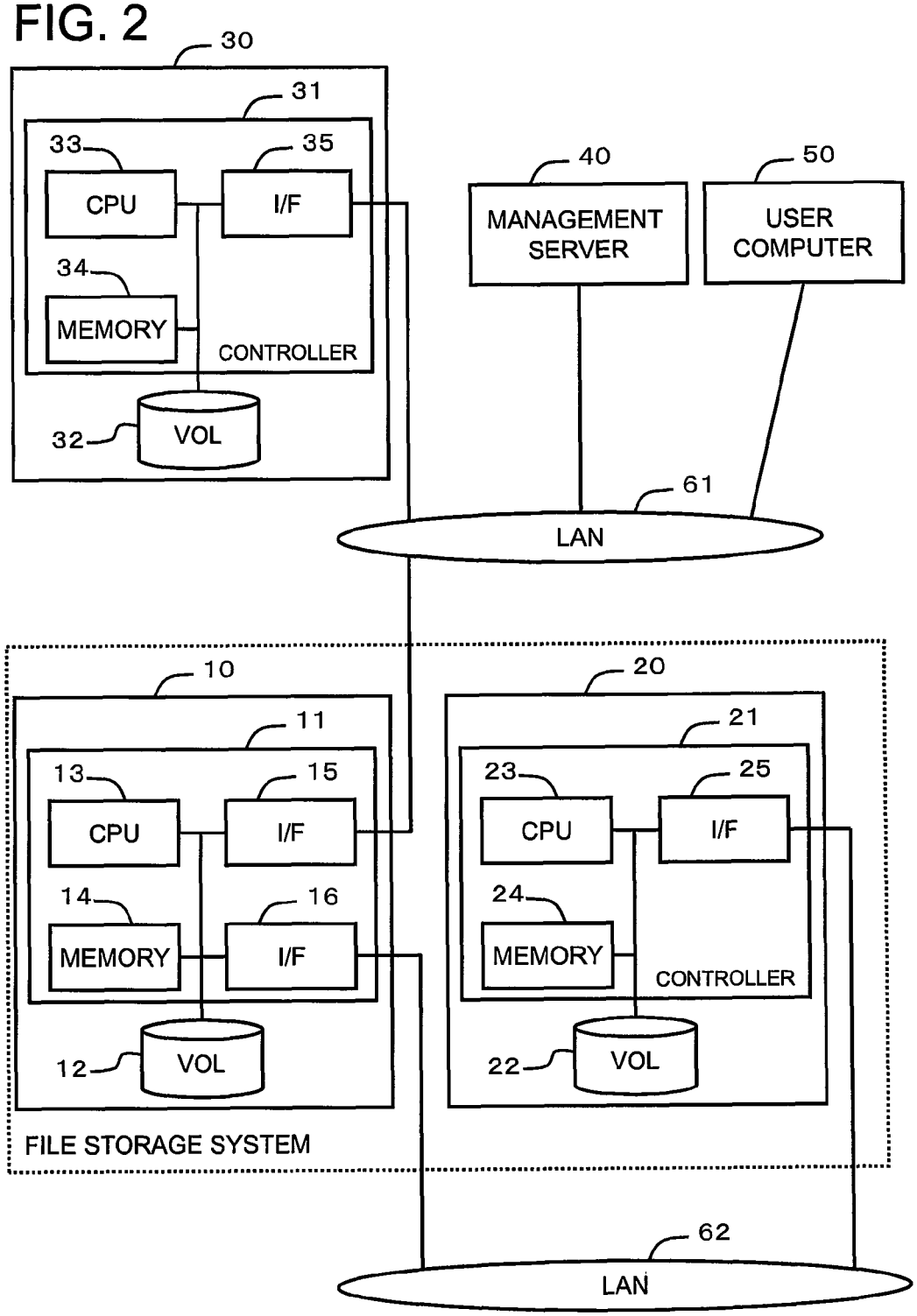
FIG. 2 is a diagram showing a hardware configuration of a computer program.

FIG. 2 shows the entire outline of the computer system according to this embodiment. First, the correspondence relation with FIG. 1 is described. A higher level file server 10 corresponds to the higher level file server 1 shown in FIG. 1, a lower level file server 20 to the lower level file server 2 shown in FIG. 1, an application server 30 to the application server 3 shown in FIG. 1, a management server 40 to the management server 4 shown in FIG. 1, a first volume 12 to the first volume 1A shown in FIG. 1, a second volume 22 to the second volume 2A shown in FIG. 1, a communication network 61 to the communication network 6a shown in FIG. 1, and a communication network 62 to the communication network 6b shown in FIG. 1. Each of the functions 1B, 1C, 1D, 1E shown in FIG. 1 is realized by the controller 11 of the higher level file server 10.

A computer system of this embodiment is now described. The computer system has, for example, a plurality of file servers 10, 20, the application server 30, the management server 40, and the user computer 50. The higher level file server 10, the application server 30, the management server 40 and the user computer 50 are coupled to one another via the higher level communication network 61 so as to be mutually communicable with one another. The higher level file server 10 and the lower level file server 20 are coupled to each other via the lower level communication network 62 so as to be mutually communicable with each other.

The application server 30 is a server that carries out a predetermined process mainly on a group of files managed by the higher level file server 10. The application server 30 is an example of the client computer. The application server 30 has a controller 31 and a logical volume 32. The controller 31 has a microprocessor (CPU in the diagram) 33, a memory 34, and a communication interface circuit (I/F in the diagram) 35. The logical volume 32 is created using, for example, the physical storage device such as the flash memory device or hard disk drive. The logical volume 32 may be provided inside or outside the application server 30.

The management server 40 is a server that manages the setting of the higher level file server 10. The management server 40 also has a microprocessor, a memory, and a communication interface circuit (all not shown), as with the application server 30.

The user computer 50 is an example of the client computer. The user computer 50 also has a microprocessor, a memory, and a communication interface circuit (all not shown), as with the application server 30. For example, the user computer 50 saves a created file into the higher level file server 10 and updates a file managed by the higher level file server 10. Note that the computer system may include a plurality of client computers.

The higher level file server 10 is a device or a system that manages a plurality of files used by the client computers (the application server 30 and the user computer 50). The higher level file server 10 unifies and manages the plurality of file servers within the computer system. The higher level file server 10 receives and processes access from the application server 30 and the user computer 50.

The higher level file server 10 has the first controller 11 and the first volume 12. The first controller 11 controls the higher level file server 10. The first controller 11 has a microprocessor 13, a memory 14, a first communication interface circuit 15, and a second communication interface circuit 16. The first communication interface circuit 15 performs communication via the higher level communication network 61. The second communication interface circuit 16 performs communication via the lower level communication network 62.

The first volume 12 is configured by a relatively high-speed storage device. The first volume 12 provides a higher level tier (tier1 in the diagram). The first volume 12 can be provided inside or outside the higher level file server 10.

The lower level file server 20 is a device that manages the plurality of files in cooperation with the higher level file server 10. The lower level file server 20 stores a file from the higher level file server 10. The lower level file server 20 has the second controller 21 and the second volume 22. The second volume 22 is generated as a relatively low-speed volume. The second volume 22 provides a lower level tier (tier2 in the diagram).

The second controller 21 controls the lower level file server 20. The second controller 21 has a microprocessor 23, a memory 24, and a communication interface circuit 25. The communication interface circuit 25 mutually communicates with the higher level file server 10 via the lower level communication network 62.

It should be noted that one or more controllers that receive the file access request from the user computer and blocks access to a plurality of types of storage devices having different performances to provide the HSM is generically called "file access controller." In FIG. 2, the system having a combination of the first controller 11 and the second controller 21 is the file access controller. The same controller may take charge of the first controller 11 and the second controller 21, in which case the abovementioned common controller corresponds to the file access controller. Note that there may be a plurality of controllers. And the file access controller may include the management server 40 or perform the processing of the management server 40.

It should be noted that the file storage system shown in FIG. 2 includes the first controller 11 and the second controller 21 as the controllers receiving access from the user computer 50, and the first volume 12 and the second volume 22 as the plurality of types of storage devices having different performances.

Similarly, the first volume 12 (first storage device) and the second volume 22 (second storage device) may be included in a common external block storage system, also may be included in different external block storage system. And, the application server may be plural, and the user computer may be plural.

Figure 3:
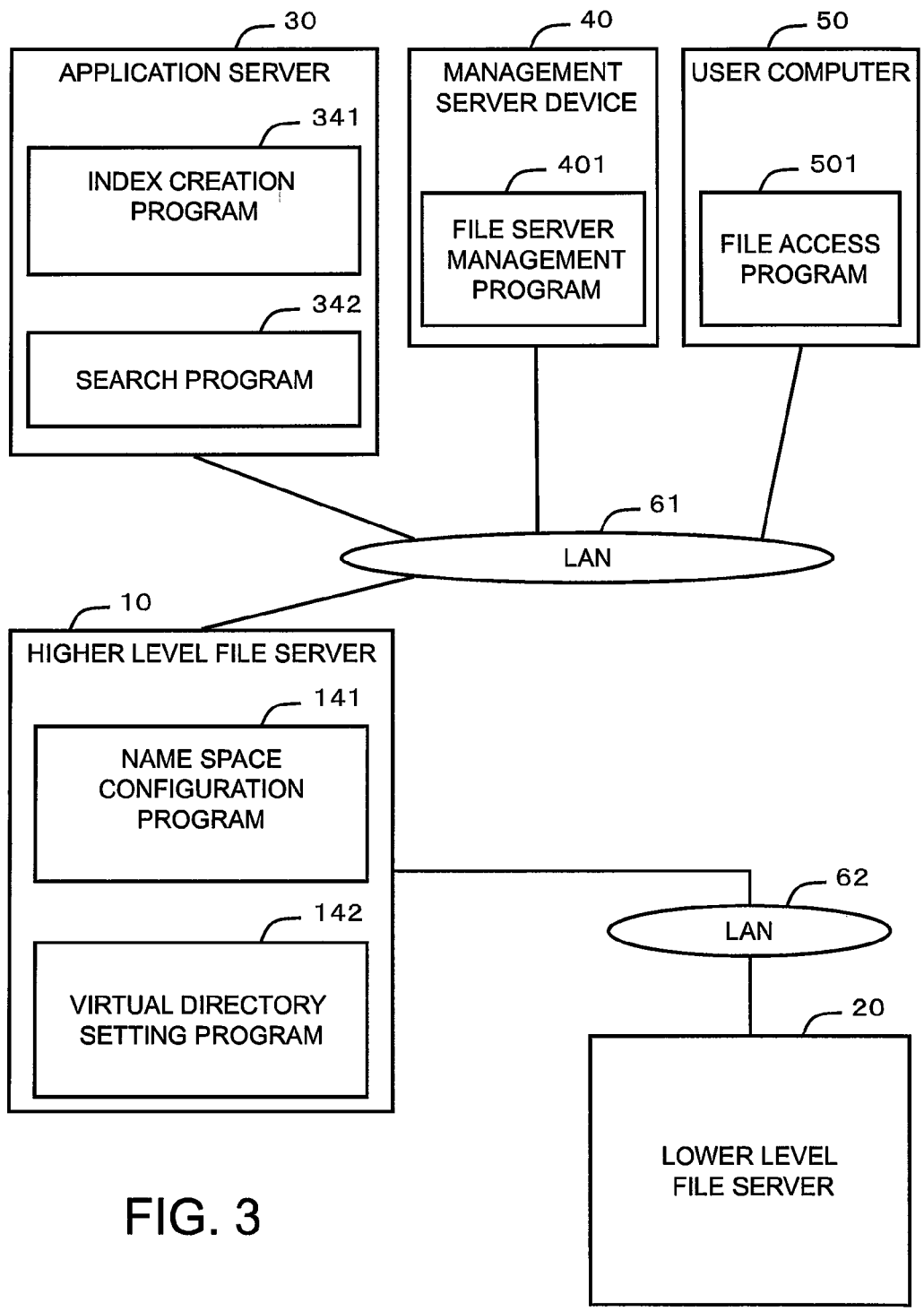
FIG. 3 is a diagram showing a software configuration of the computer program.

FIG. 3 shows a software configuration of the computer system. The application server 30 has, as an example of an application program, an index creation program 341 and a search program 342. These programs 341, 342 are stored in the logical volume 32 of the application server 30. The application program may be not only the index creation program 341 and the search program 342 but also a program that cleans the computer viruses.

The management server 40 has a program 401 for managing the file servers (to be referred to as "management program" hereinafter). The user uses the management program 401 to set the virtual directory in the higher level file server 10.

The management server 40 can have a user interface module. The user interface module includes an input device for inputting information into the management server 40, and an output device for outputting the information from the management server 40. Examples of the input device include a keyboard, a pointing device, a microphone, and a camera. Examples of the output device include a display device, a speaker, and a printer.

A computer terminal having the input device and the output device may be communicably coupled to the management server 40. For example, a cellular phone, a handheld terminal, a personal computer, or another type of computer terminal possessed by the user can be used to provide a command to the management server 40 or display the information from the management server 40.

Note that the management server 40 can be configured by a single computer. Alternatively, one management server 40 can be configured by a plurality of computers.

The user computer 50 has a file access program 501. The file access program 501 is a program that access the file managed by the higher level file server 10. Examples of the file access program 501 include word-processing software, spreadsheet software, image-editing software, and customer management software.

The application programs (341, 342) of the application server 30 carry out a predetermined process mainly on a relatively large number of files, because the predetermined process is intended for a plurality of files created by a plurality of users. The file access program 501 of the user computer 50 carries out a process on mainly a relatively small number of files, because the file access program 501 is used by each of the users.

The higher level file server 10 has a name space configuration program 141 and a virtual directory setting program 142. The name space configuration program 141 is a program for managing the configuration of the name space, and includes a part of the file system program. The detail thereof is described hereinafter with reference to FIG. 5. The virtual directory setting program 142 is a program for setting the virtual directory in response to a command from the management program 401. The detail thereof is described hereinafter with reference to FIG. 6.

The lower level file server 20 has a file system program for carrying out a basic file input/output process. The lower level file server 20 stores a file received from the higher level file server 10 into the second volume 22. The lower level file server 20 further reads the file out of the second volume 22 and transfers the file to the higher level file server 10 in response to a request from the higher level file server 10.

Figure 4:
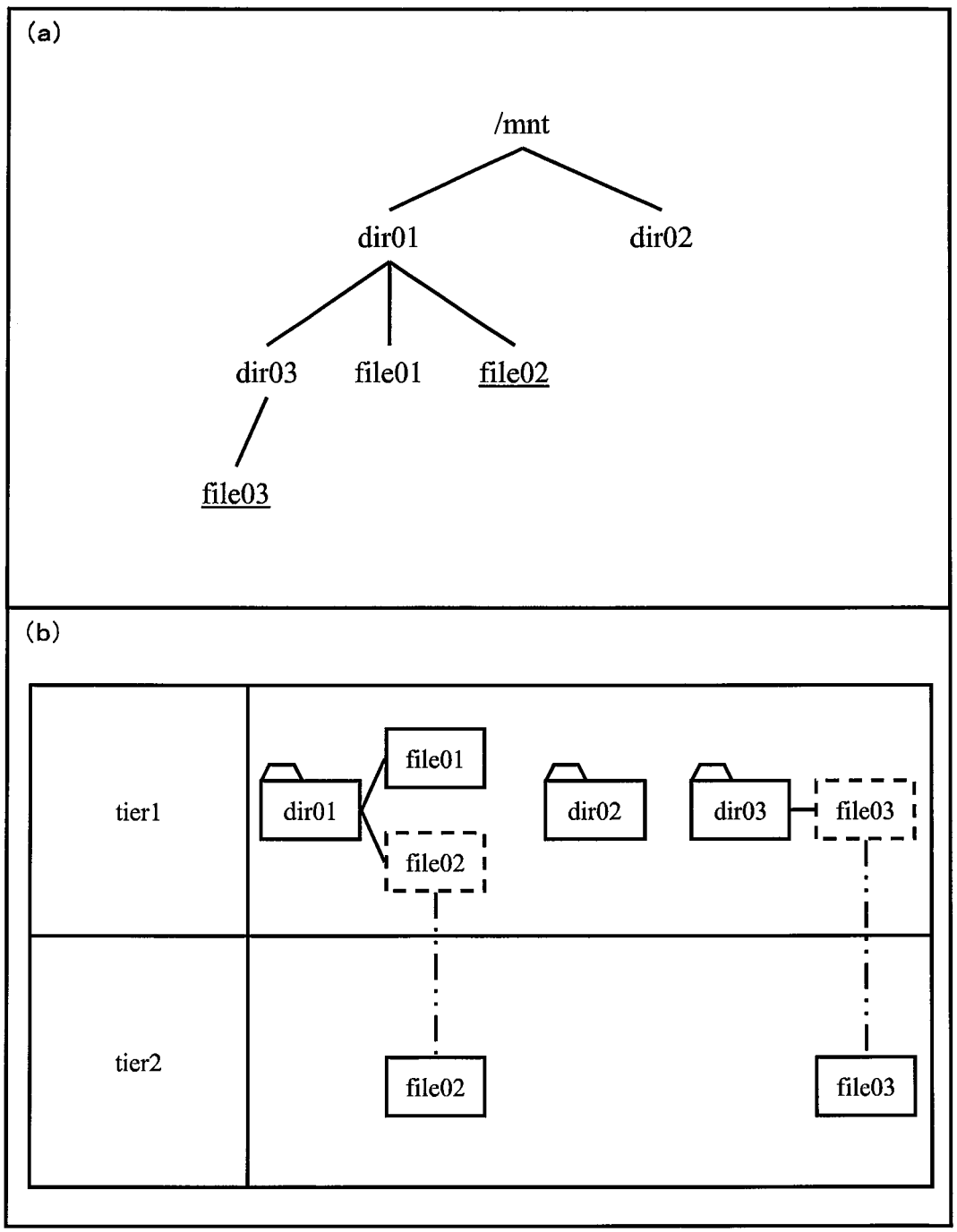
FIG. 4 is a diagram showing how a common name space manages files dispersed to and stored in a plurality of tiers.

FIG. 4 shows a configuration of the name space.

A directory tree shown in FIG. 4(*a*) is provided to the client computer such as the application server 30 or the user computer 50. It appears to the client computer as if both of the files are included in the directory file shown in FIG. 4(*a*), regardless of whether the file data is stored in the first volume 11 or the second volume 12.

However, as shown in FIG. 4(*b*), some files out of the plurality of files included in the directory tree shown in FIG. 4(*a*) are the stubbed files. In the example shown in FIG. 4, "file02" and "file03" are the stubbed files, and the file data are actually stored in the second volume 22.

It should be noted that, preferably, some sort of a file for storing the file data is generated in the second volume 22. However, the file that is created for storing the file data in the second volume 22 does not have to have attribute information other than the actual data, such as time stamps or access control information. A time stamp is a last access time. The access control information is the information indicating the name of a host or user that can access the file. In other words, the second volume 22 can be used as a storage region for saving only the actual data of the file. Thus, the storage capacity of the second volume 22 can be used efficiently.

Figure 5:
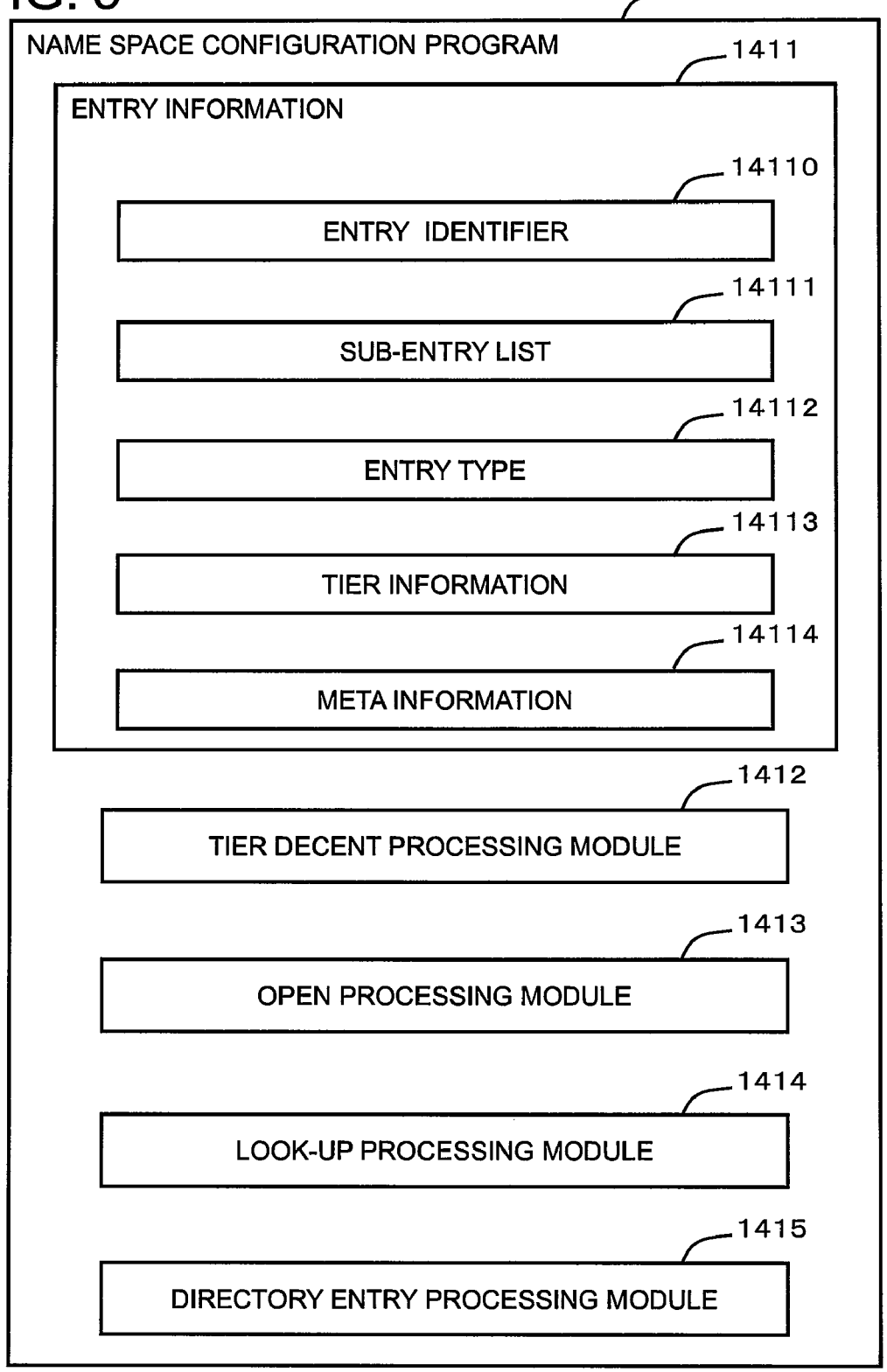
FIG. 5 is a diagram showing a configuration of a name space configuration program.

FIG. 5 shows the name space configuration program 141 in detail. The name space configuration program 141 has entry information 1411, a tier descent processing module 1412, an open processing module 1413, a look-up processing module 1414, and a directory entry processing module 1415. Note that in FIG. 5 the entry information 1411 is included in the program, but the entry information 1411 is not actually included in the program or stored in the first memory 14 and/or the logical volume that is the higher level tier 1.

The entry information 1411 is prepared for each file (including folders). The entry information 1411 is an information structure for managing the configuration of each file or folder. The entry information 1411 includes an entry identifier 14110, a subentry list 14111, entry type 14112, tier information 14113 and meta-information 14114.

The entry identifier 14110 is an identifier for identifying the entry information 1411.

The entry type 14112 is the information indicating whether the entity corresponding to the entry information 1411 is a file or a directory (folder).

The tier information 14113 indicates a tier in which the file data of a file are stored when the file corresponds to the entry information 1411. For example, when the file data of the target file is recorded in the first volume 12, "tier 1" is recorded in the tier information 14113. When the file data of the target file is recorded in the second volume 22, "tier 2" is recorded in the tier information 14113. Note that the tier information 14113 may be in any other form for storing information as long as it can discriminate whether the file corresponding to the entry information 1411 is the stubbed file or not.

The meta-information 14114 is meta-information of the target entry. Examples of the meta-information include the last access time, the access control information (access authority), and the attribute information such as the file size. In this embodiment, the attributes of the file are managed by the meta-information 14114 within the higher level file server 10. Therefore, the second volume 22 does not have to store the attribute information of the file whose file data are stored in the second volume.

The information stored in the subentry list 14111 varies as follows depending on the entry type 14112 and the tier information 14113.

In a case where the entry type 14112 indicates file and the tier information 14113 indicates the tier 1, which is a file that is not stubbed, the subentry list 14111 indicates the identifier of the first volume in which are stored the file data of the file corresponding to the entry information 1411, and a block address range within the first volume (not limited to a continuous range).

In a case where the entry type 14112 indicates directory, when there exists a file or directory included in the directory ("included in the directory" also means "below the directory" or "under the directory"), the sub entry list 14111 indicates the name of the included file or directory and the entry identifier corresponding to the included file or directory. In a case where the entry type 14112 indicates file and the tier information 14113 is the tier 2, which is the entry information related to the stubbed file, the subentry list 14111 indicates the identifier of the first volume in which are stored the file data of the file corresponding to the entry information 1411, a block address range (not necessarily a continuous range) within the first volume. Note that, in a storage region that is indicated by the block address range within the first volume indicated by the subentry list 14111, the identifier of the second file server 20 and the identifier for accessing a file generated by the second file server are stored in order to indicate a region in which the file data are stored as the stub file. Moreover, in a case where the first controller is in the block access format and capable of accessing the volumes other than the tier 1, the identifiers of the volumes other than the tier 1 (for example, the second volume 22) in which the file data are stored, and the block address range (not necessarily a continuous range) within this volume may be stored.

Note that the identifier for accessing the file data may be stored in the subentry list 14111 itself.

The tier descent processing module 1412 is a program that moves a file satisfying a predetermined moving condition, out of the files stored in the first volume 12, to the second volume 22, and then stores not this file but the stub file into the first volume 12. The tier descent processing module 1412 is described hereinafter in detail with reference to FIG. 7.

The open processing module 1413 is a program for accessing the files or folders directly. The open processing module 1413 is described hereinafter in detail with reference to FIG. 8.

The look-up processing module 1414 is a program for searching for an integrated file system and discovering an objective file or folder. The look-up processing module 1414 is described hereinafter in detail with reference to FIGS. 9 and 10.

The directory entry processing module 1415 is a program for following the directory tree to access the objective file or folder. The detail thereof is described hereinafter with reference to FIGS. 11 and 12.

Note that, although not shown, the higher level file server 10 stores, as a program onto the memory, a reference process for referring to the entry information, reading reference data of the file designated by the client out of the file data stored in the first volume, and transmitting the reference data to the client computer. The higher level file server 10 also stores, as a program onto the memory, an adding/updating process for referring to and updating the entry information and storing the updated or added data that is transmitted from the client computer, into the first volume. Needless to say, the last access time stored in the meta-information 14114 is updated by executing these processes.

Figure 6:
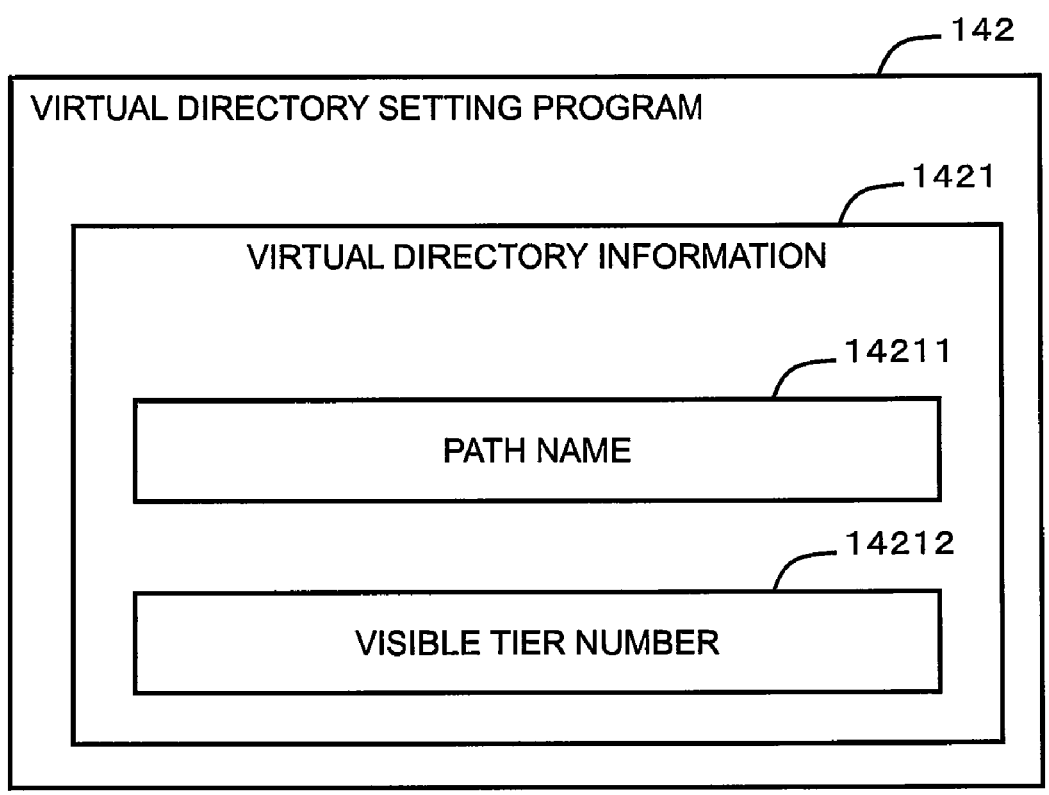
FIG. 6 is a diagram showing a configuration of a virtual directory setting program.

FIG. 6 shows the virtual directory setting program 142 in detail. The virtual directory setting program 142 has virtual directory information 1421. The virtual directory information 1421 includes, for example, a path name 14211 and a visible tier number 14212. The virtual directory is so provided that the stub files are hidden and made inaccessible. Note that although FIG. 6 shows that the virtual directory information 1421 is included in the program, but this e virtual directory information 1421 may be stored in the first memory 14 without being included in the program.

The path name 14211 shows the position where the virtual directory is provided. The path name is described as, for example, "/mnt/tier1." The visible tier number 14212 is a number for specifying a tier to be displayed (tier that permits access). When "1" is set as the visible tier number, only a higher level tier provided by the first volume 12 is made accessible. When "2" is set as the visible tier number, only a lower level tier provided by the second volume 22 is made accessible. In the case of three tiers configured by the higher level tier, middle tier and lower level tier, any number of 1, 2 and 3 is set as the visible tier number.

A tier descent process is now described with reference to FIG. 7. Each process described hereinafter is realized by causing the microprocessor 13 to read each of the programs 1412 to 1415 stored in the memory 14. Thus, the subject of each process described below may be "program" or "microprocessor." The subject of each processing described below may also be "controller" or "file server." For the sake of convenience, this embodiment describes the operations of the programs by using "controller" as the subject.

The whole or part of each of the programs may be realized as a specialized hardware circuit. Each program can be installed on the file server 10 via a program distribution server that distributes the programs. Furthermore, each program fixed to the recording medium may be read by the file server 10 and installed on the file server 10.

Figure 7:
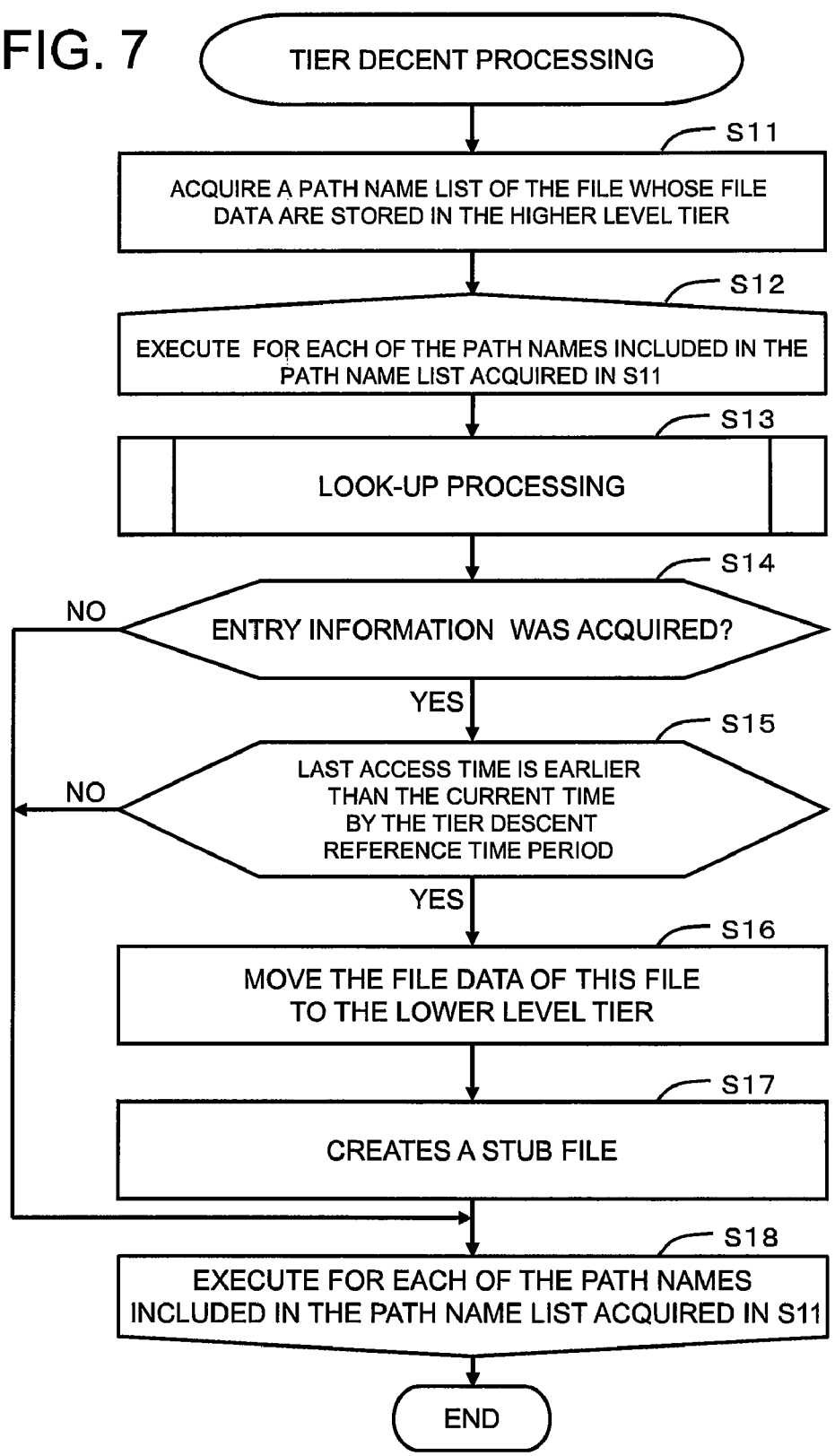
FIG. 7 is a flowchart showing a process for moving a file to a lower level tier to create a stub.

The tier descent process shown in FIG. 7 is executed repeated at a predetermined timing defined by the first controller 11.

The tier descent process is repeated executed once a month, for example, but may be carried out at different timing. In addition, this repetition frequency is a value received by the management server 30 from the manager of the file storage system, and this value may be taken as a basis for determining the predetermined timing by receiving this value from the management server 30 and keeping it in the first controller 11. The detail of the flow is described below.

The first controller 11 first acquires a path name list of the file whose file data are stored in the higher level tier, the file being the file that is not stubbed (S11). The first controller executes S13 to S17 for each of the path names included in the path name list acquired in S11. (S12, S18). The first controller 11 carries out a look-up process on the path name selected in S12 (S13). Note that, in the look-up process, the entry information 1141 of the file corresponding to a designated path name is acquired. The first controller 11 determines whether or not the entry information 1411 was acquired in the look-up process (S14). When the entry information 1411 was not acquired (S14: NO), the process related to the path name selected in the previous S12 is ended, and the first controller 11 returns to S12.

On the other hand, when the entry information 1141 was acquired (S14: YES), the first controller 11 acquires, from the meta-information 14114 of the acquired entry information 1411, the last access time. The first controller 11 determines whether or not the file is a file whose last access time is earlier than the current time by the tier descent reference time period (S15).

When S15 is not realized, that is, when the file selected in S12 was accessed within the tier descent reference time period elapsed since the last access time (S15: NO), the process on the path name selected in the previous S12 is ended, and the first controller 11 returns to S12. When S15 is realized (S15: YES), the first controller 11 moves the file data of this file to the lower level tier (the second volume 22) (S16). The first controller 11 creates a stub file and stores the stub file in the higher level tier (the first volume 12) (S17). The detail of the stub file is as described with reference to FIG. 5. Note that moving the file data to the lower level in S16 is specifically carried out as follows.

The lower level file server 20 is caused to create a new file, and file data to be moved to the created file of the lower level file server 20 is written. If the file of the lower level file server 20 already corresponds to the file selected in S16, creation of a new file may be omitted.

The file data to be moved is written into an unused storage region of the second volume 22. When the storage region of the second volume 22 already corresponds to the file selected in S16, the file data to be moved may be written into this region.

In addition, another selection criterion may be added to by the path names included in the path name list in S11. Also, when the file storage system defines three or more tiers, the tier descent process may be applied when bringing a file down from the highest tier to another tier as described above, or when bringing a file down between two tiers other than the highest tier. In this case, however, mainly for the file whose file data exist in a tier other than the highest level tier, in S11 the storage destination of the file data indicated by the stub file of the higher tier is updated, instead of generating the stub file of S17.

Figure 8:
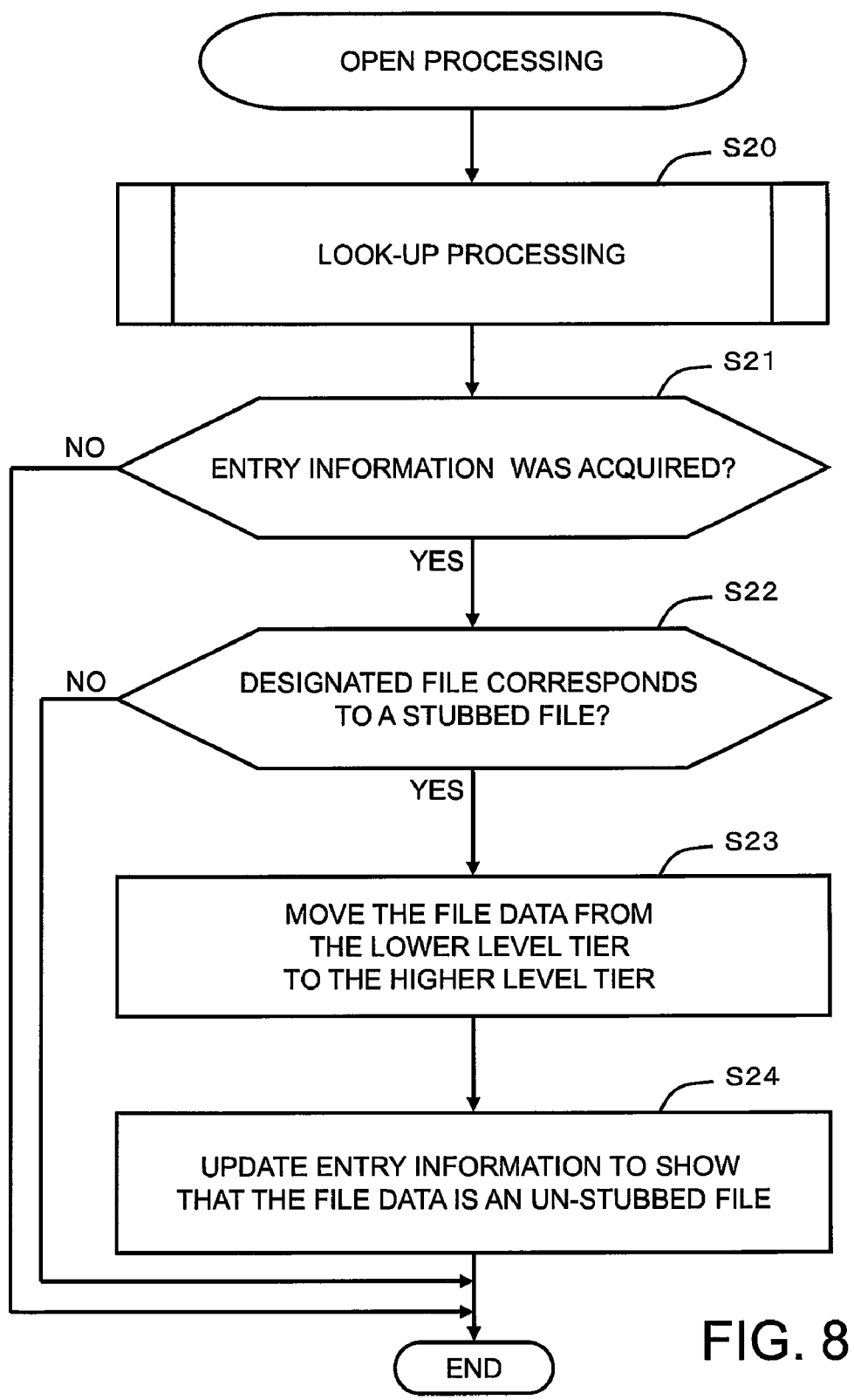
FIG. 8 is a flowchart showing a process for opening the file.

FIG. 8 is a flowchart of an open process. Note that the open process is executed when the higher level file server 10 receives the following file access request.

When an open request that directly or indirectly designates a file is received from the client computer.

When a reference (read) request and addition or update (write) request for the file data designating a file directly or indirectly is received from the client computer, and when a target file is not opened.

Because these cases are merely examples, the open process may be executed at a different moment. Especially for the latter case, the open process is not necessarily executed. For example, the open process is executed in the latter case in case of NFS where the open request is not defined based on the file access request for the file storage system received from the client computer, but the open process is necessary because the process is not closed every time the latter request is completed. The detail of the process is described below.

The first controller 11 first carries out the look-up process on a file designated as a file to be opened (S20). The first controller 11 determines whether or not the entry information 1411 was acquired in the look-up process (S21).

When the entry information 1411 is not acquired (S21: NO), this process ends. When the entry information 1411 is acquired (S21: YES), the first controller 11 determines whether or not this acquired entry information 1411 corresponds to a stubbed file (S22). Note that the determination is made by referring to the tier information 14113 of the acquired entry information 1411.

When the acquired entry information 1411 corresponds to the stubbed file (S22: YES), the first controller 11 moves or copies the file data of this stubbed file from the logical volume of the lower level tier to the logical volume of the higher level tier (S23).

When the entry information 1411 acquired in the look-up process does not correspond to the stubbed file (S22: NO), step S23 is skipped. Finally, the first controller 11 updates the file information 1411 acquired in the look-up process to show that the file is not stubbed. Specifically, the first controller 11 updates the subentry list 14111 to show the file data moved or copied to the higher level tier, and the tier information 14113 updates the information to show that the file data exist in the higher level tier.

The above has described the open process, but a general file open process besides the open process described above may be adopted. For example, there may be a process for applying a file access identifier (file descriptor) corresponding to the opened file (or, if need be, transmitting the file access identifier to the client computer).

Figure 9:
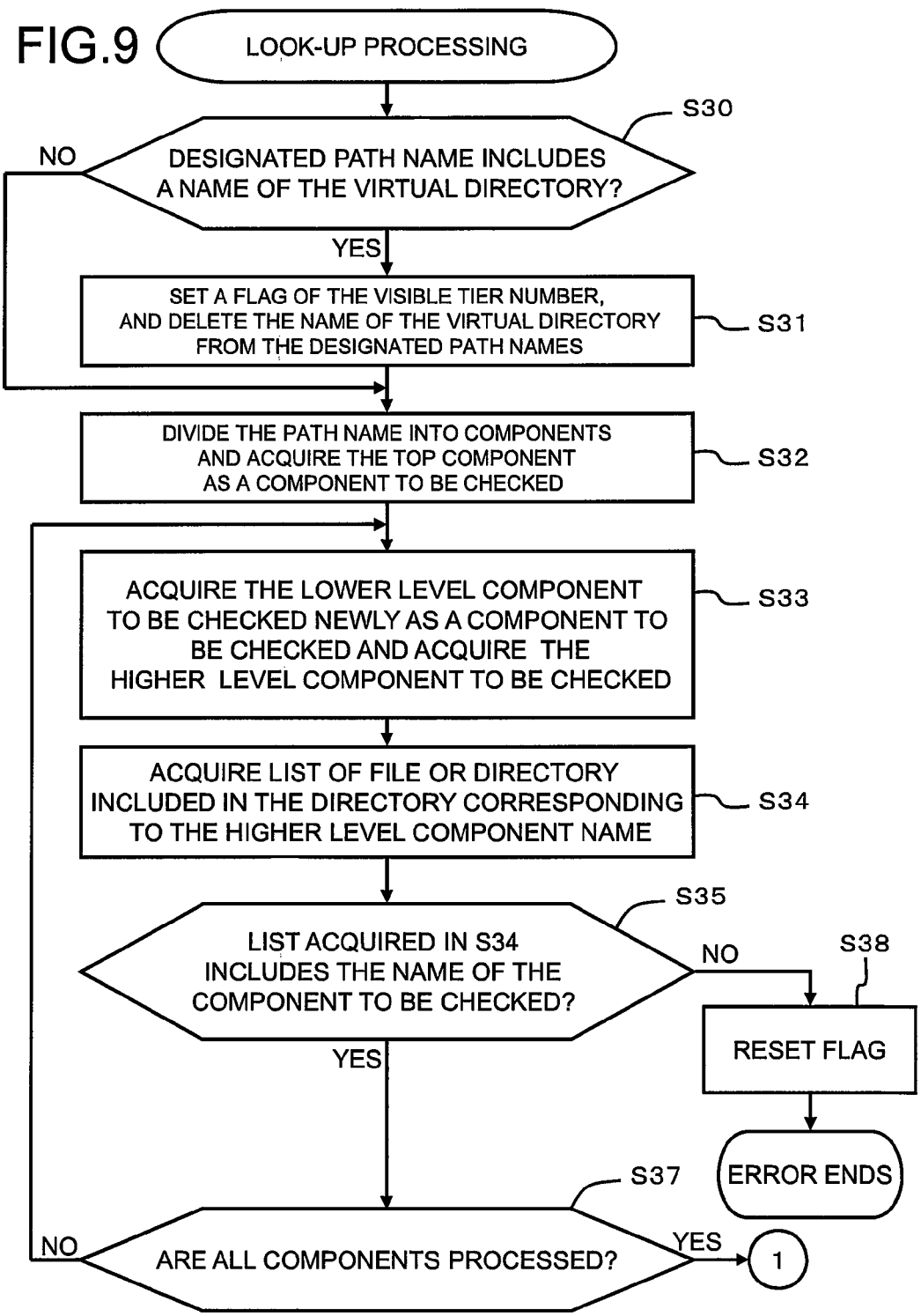
FIG. 9 is a flowchart showing a look-up process.
Figure 10:
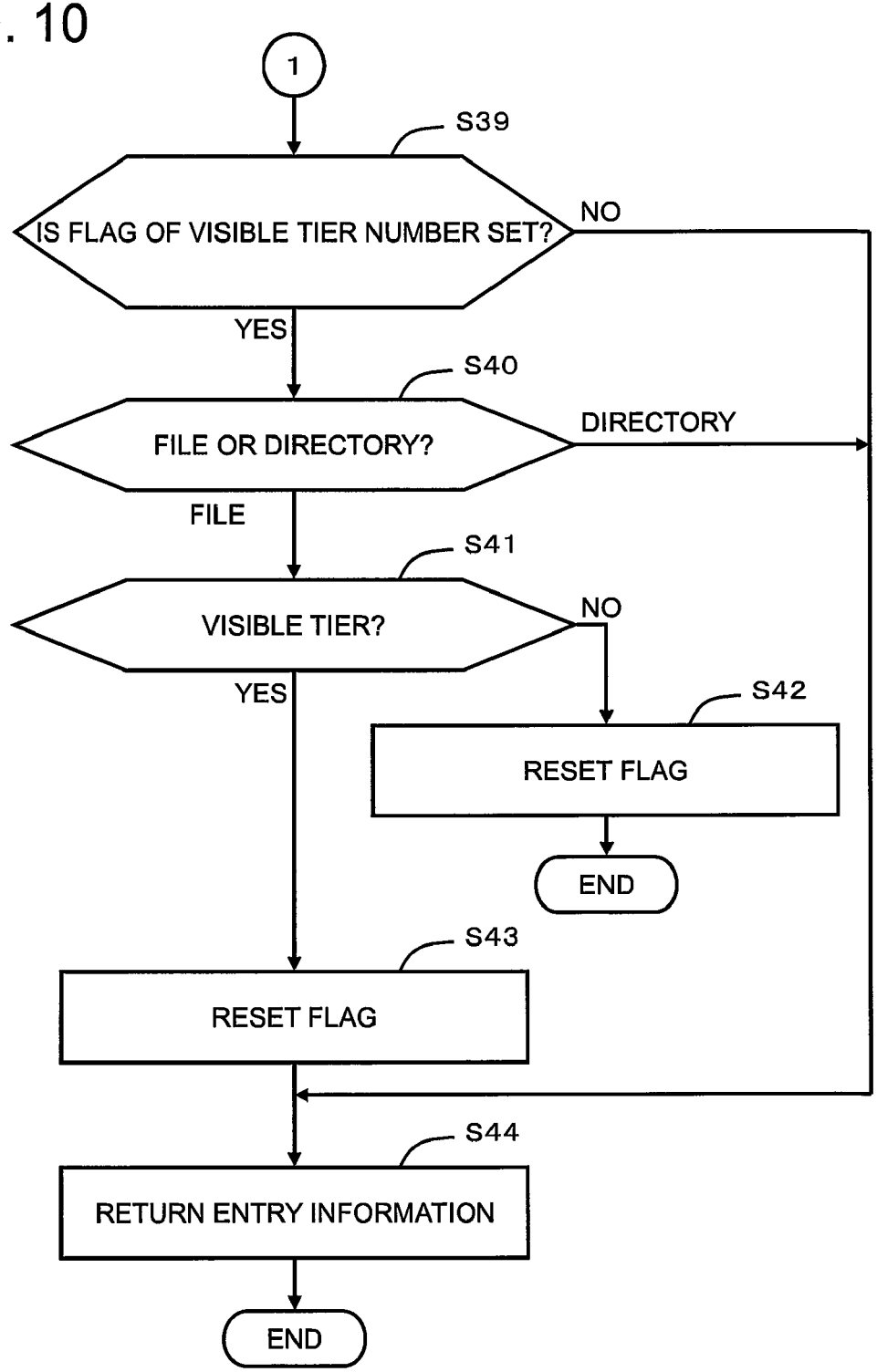
FIG. 10 is a flowchart following the flowchart shown in FIG. 9.
Figure 11:
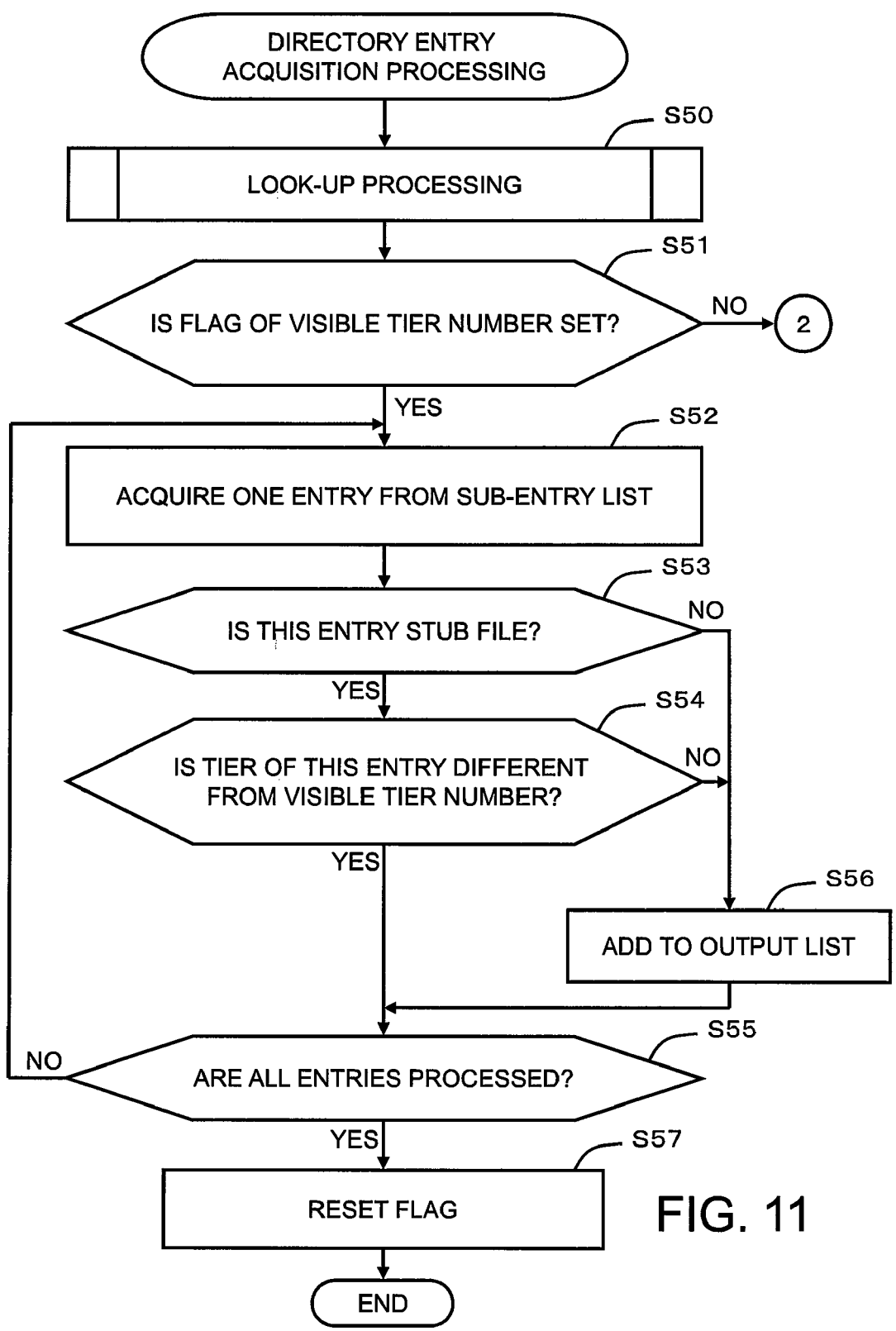
FIG. 11 is a flowchart showing a process for acquiring a directory entry.
Figure 12:
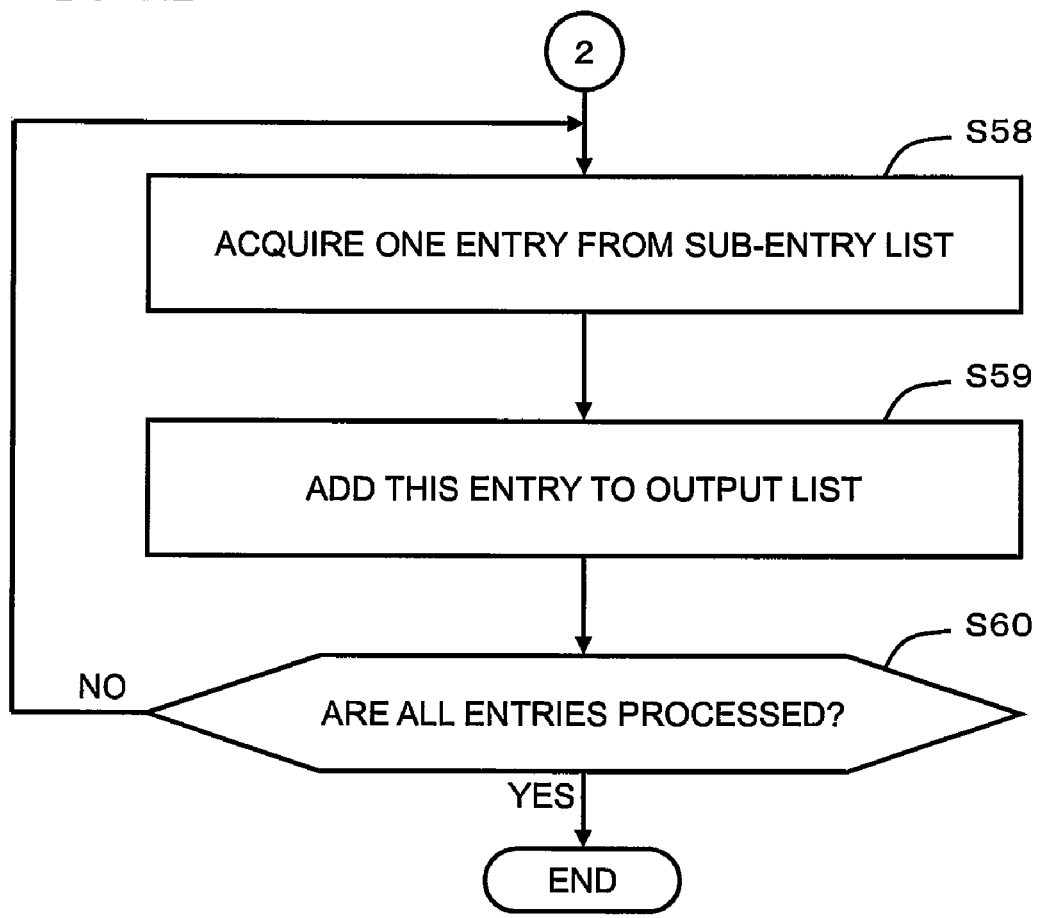
FIG. 12 is a flowchart following the flowchart shown in FIG. 11.

FIGS. 9 and 10 are flowcharts showing in detail the look-up process used in FIGS. 7, 8 and 11.

The first controller 11 determines whether or not a designated path name designates a file or directory under the virtual directory (S30).

A case in which the path name is designated as "/mnt/tier1/dir01/file02" is described herein as an example. Specifically, a case in which a file under the virtual directory is designated is explained first.

Because the designated path name includes the virtual directory (tier1) (S30: YES), the first controller 11 sets a flag of the visible tier number established in the visible tier number 14212 of the virtual directory information 1421, and deletes the name of the virtual directory (tier 1) from the path names (S31). The visible tier number flag here means a flag that is used in this process or in a directory entry process (FIG. 11), and indicates the tier to be displayed. In the example of the previous path name, "1" is set as the visible tier number flag.

The following steps S32 to S37 recursively describe a process for acquiring the entry information 1411 with respect to the designated path name from which the name of the virtual directory is removed in S31.

The first controller 11 then divides the path name into components (S32) and acquires the top component (the highest component) as a component to be checked (S32). The components here mean the elements configuring the path name that do not include "/." The symbol "/" is a mark for distinguishing between the adjacent components. In the example above, "mnt," "tier1," "dir01," and "file02" are the components. Note that the higher level components are components located on the left-hand side in the description of the path names. The lower components are components located on the right-hand side in the description of the path names. The component acquired in S32 is mnt.

The first controller 11 acquires a lower level component of the component to be checked as a new component to be checked. In the above example, because the tier 1 is deleted in S31, the component corresponds to dir01 in the first loop and to file02 in the next loop. The first controller 11 also acquires a higher level component of the component to be checked. This component corresponds to mnt in the first loop and to the dir01 in the next loop (S33).

With respect to a directory indicated by the higher level component of the component to be checked, the first controller 11 acquires a list in which a file included in the directory or the name of the directory is stored. Note that this process is performed by referring to the file data stored on the higher level tier and indicated by the subentry list of the entry information 1411 of the directory (S34).

The first controller 11 checks whether the list acquired in S34 includes the name of the component to be checked (S35).

When the name of the component to be checked is not included in the list acquired in S34 (S35: NO), the first controller 11 resets the visible tier number flag that is set in step S31, and this process is terminated with error (S38). This is because the designate path name does not coincide with the actual directory tree. The client computer that receives an error notification from the first controller 11 can designate a new path name.

When the name of the component to be checked is included in the list acquired in S34 (S35: YES), the first controller 11 determines whether or not all of the components included in the designated path name are checked as the component to be checked (S37). Whether all of the components are processed or not is determined based on whether the component to be checked coincides with a component located on the rightmost side of the path names. When there is any unprocessed component (S37: NO), the first controller 11 returns to step S33 to acquire the next component (S33). When there is no unprocessed component, the process of S39 is executed.

The first controller 11 determines whether or not the visible tier number flag is set (S39). When a virtual tier number flag is not set (S39: NO), S44 is executed. When the visible tier number flag is set (S39: YES), the first controller 11 refers to the entry information 1411 corresponding to the component which finally becomes the higher level component to be checked (file 02 in this example), and determines whether the designated path name is a file or a directory (S40). Even when the result of the determination performed in S40 indicates a directory, S44 is executed.

The first controller 11 returns the entry information 1411 of this folder to the caller program for the look-up process without resetting the visible tier number (S44). The reason why the visible tier number flag is not reset in the case of the directory is because the visible tier number flag is used in the directory entry process that is described hereinbelow.

When the result of the determination performed in S40 indicates a file (including a stubbed file), the first controller 11 refers to the tier information 14113 of the entry information 1411 of this file, and determines whether or not the tier to which the file belongs to coincide with the tier shown by the visible tier number flag (S41). In other words, the first controller 11 determines whether a request for causing the directory tree to display the stub file is generated or not (S41). Therefore, FIG. 10 shows "visible tier?" for convenience.

When the tier to which the file belongs to does not coincide with the tier shown by the visible tier number flag (S41: NO), the first controller 11 resets the visible tier number flag (S42) and ends this process. In other words, the first controller 11 does not return the entry of the stub file to the caller program for the look-up process.

When searching for a file on the normal directory, the first controller 11 moves to step S32 because the result of step S30 is NO. Since the visible tier number flag is not set, the result of step S39 shown in FIG. 10 is determined as NO, and consequently the first controller 11 returns the information 1411 of the discovered entry to the caller program for the look-up process.

When searching for a file on the virtual directory, the visible tier number flag is set (S31). Therefore, whether or not to display on the virtual directory is controlled in response to the type of the final entry and the set value of the visible tier number flag (S40, S41). In other words, under the virtual directory, only the actual file or folder belonging to the designated tier is displayed, but the stub file is not displayed.

The above has described the look-up process. In order to simplify the explanation, the present invention describes that the path name designated by the client computer is the same as the path name designated when various processes are designated within the file storage system. However, in actual file storage, the path name designated by the client computer is converted based on a predetermined reference and used for designating the various processes. For example, the directory tree, which is provided to the client computer by a file storage subsystem, is sometimes a part of an internal directory tree managed in the file storage. In this case, because the file storage system holds information indicating from which directory (to be referred to as "export point") the internal directory is provided to the client computer, the path name of the export point may be added to the top of the path name received from the client computer.

FIG. 11 is a flowchart of the directory entry process. The directory entry process is executed when, for example, the higher level file server 10 receives the following file access requests.

When an information acquisition request of a file or directory, which designates the path name of a directory or file, is received.

Note that examples of the information transmitted in response to the file information acquisition request include the last access time stored in the meta-information 14114, access authority, and file size. Examples of the information transmitted in response to the directory information acquisition request include information on the access request, for the directory. When recursive output is taken into consideration, the examples include the information on the files included in the directory or on the list of the directory, as well as the following information for the files included in this directory.

The first controller 11 executes the look-up process for the designated path name (S50). The first controller 11 then determines whether the visible tier number flag is set or not (S51). When the visible tier number flag is not set (S51: NO), the first controller 11 moves to step S58 described below.

When the visible tier number flag is set (S51: YES), the first controller 11 acquires the entry information 1411 of the file or directory corresponding to the designated path (S52). The first controller 11 then determines whether the designated path name is the stubbed file or not (S53). Judgment is executed as thus explained and the explanation thereof is omitted. When the result of the determination performed in S53 does not indicate the stubbed file (S53: NO), the first controller 11 adds the entry information 1411 acquired in step S52, particularly the meta-information 14114, to an output list. Information to be added further may be the information that has been described in reference to FIG. 11 (S56).

When the result of the determination performed in S53 indicates the stubbed file (S53: YES), the first controller 11 determines whether the tier shown by the tier information 14113 of the entry information 1411 acquired in S52 is different from the tier shown by the visible tier number flag (S54).

When the tier information 14113 of the entry information 1411 acquired in S52 coincides with the tier shown by the visible tier number flag (S54: NO), the first controller 11 adds the entry acquired in S52 to the output list (S56).

When the tier information 14113 of the entry information 1411 acquired in S52 does not coincide with the tier shown by the visible tier number flag (S54: YES), the first controller 11 determines whether the entries up to the final entry (the component on the far right) of the path name are processed or not (S55). When there remains unprocessed entry information 1411 (S55: NO), the first controller 11 executes the steps S52 to S55 again. When all of the entries are completely processed (S55: YES), the first controller 11 resets the visible tier number flag (S57) and ends this process.

When, on the other hand, the visible tier number flag is not set (S51: NO), the first controller 11 moves into the flowchart shown in FIG. 12.

The first controller 11 acquires the entry information 1411 of the file or directory corresponding to the designated path (S58), and adds this acquired entry information 1411 to the output list (S59). The first controller 11 executes the steps S58 and S59 until all of the entries are processed (S60). When all of the entries are processed (S60: YES), the first controller 11 ends this process.

The first controller 11 can output only the files located in a target tier, by following the directory tree sequentially by carrying out the process shown in FIG. 11.

Figure 13:
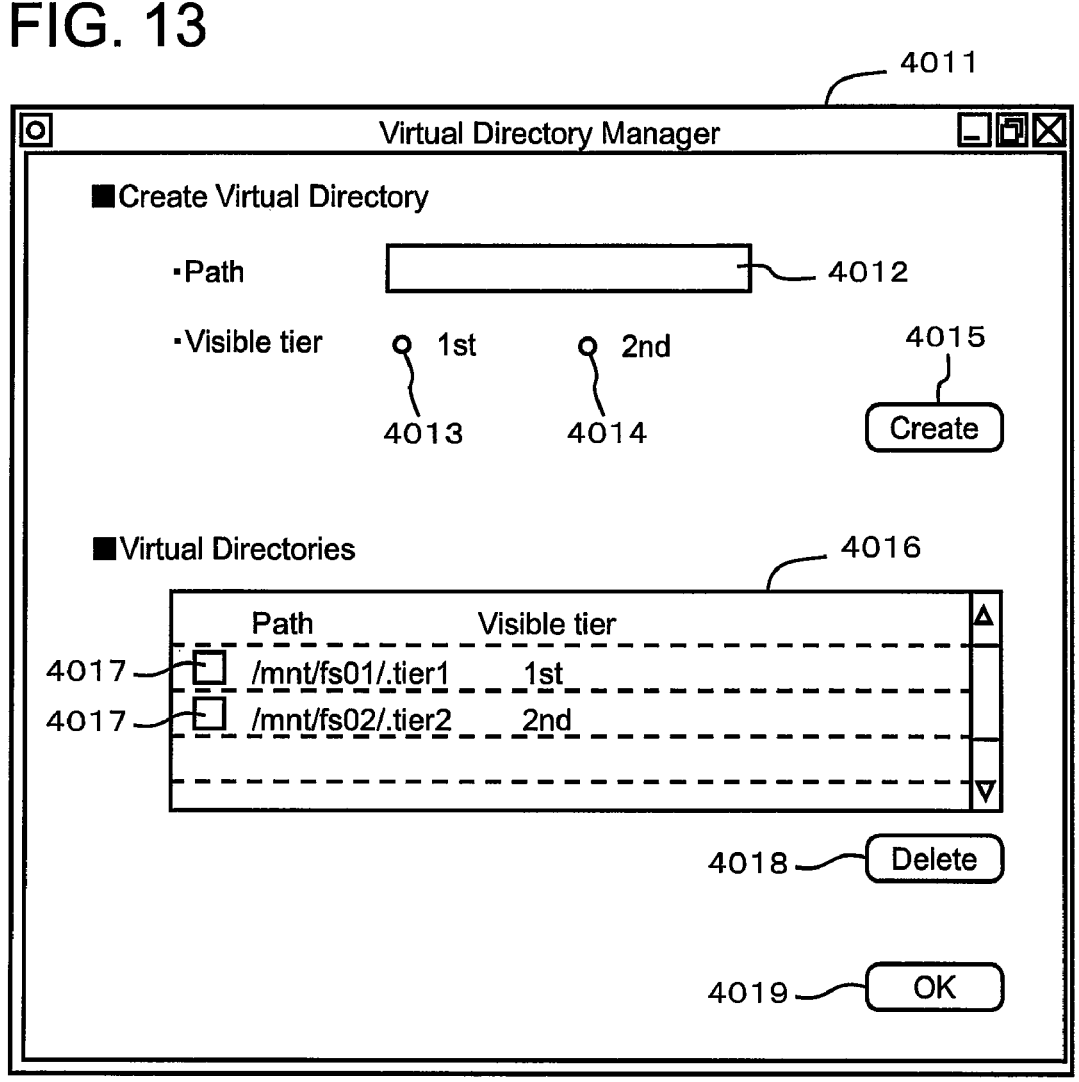
FIG. 13 is a diagram showing a screen for managing a virtual directory.

FIG. 13 shows an example of a management screen 4011 for managing a virtual directory. The virtual directory management screen 4011 is created by the management program 401 of the management server 40.

An input column 4012 is a path designating module for designating the path name of a virtual directory. Check boxes 4013, 4014 are visible tier designating modules for designating tiers to be displayed. When the check box 4013 is selected, the first tier (higher level tier) is displayed. When the check box 4014 is selected, the second tier (lower level tier) is displayed.

When the user presses a create button 4015, a command for setting a virtual directory is transmitted from the management server 40 to the higher level file server 10. A method for creating a virtual directory is described hereinbelow with reference to FIG. 14.

The management screen 4011 has a display module 4016. The display module 4016 displays a list of virtual directories that are already set. The user can select a virtual directory to be deleted, by selecting a check box 4017 displayed on the display module 4016. When the user presses a delete button, a command for deleting a virtual directory is transmitted from the management server 40 to the higher level file server 10. A method for deleting a virtual directory is described hereinbelow with reference to FIG. 15.

The management screen 4011 may display correspondence between the virtual directories 4016 and the path 4012 already set.

Figure 14:
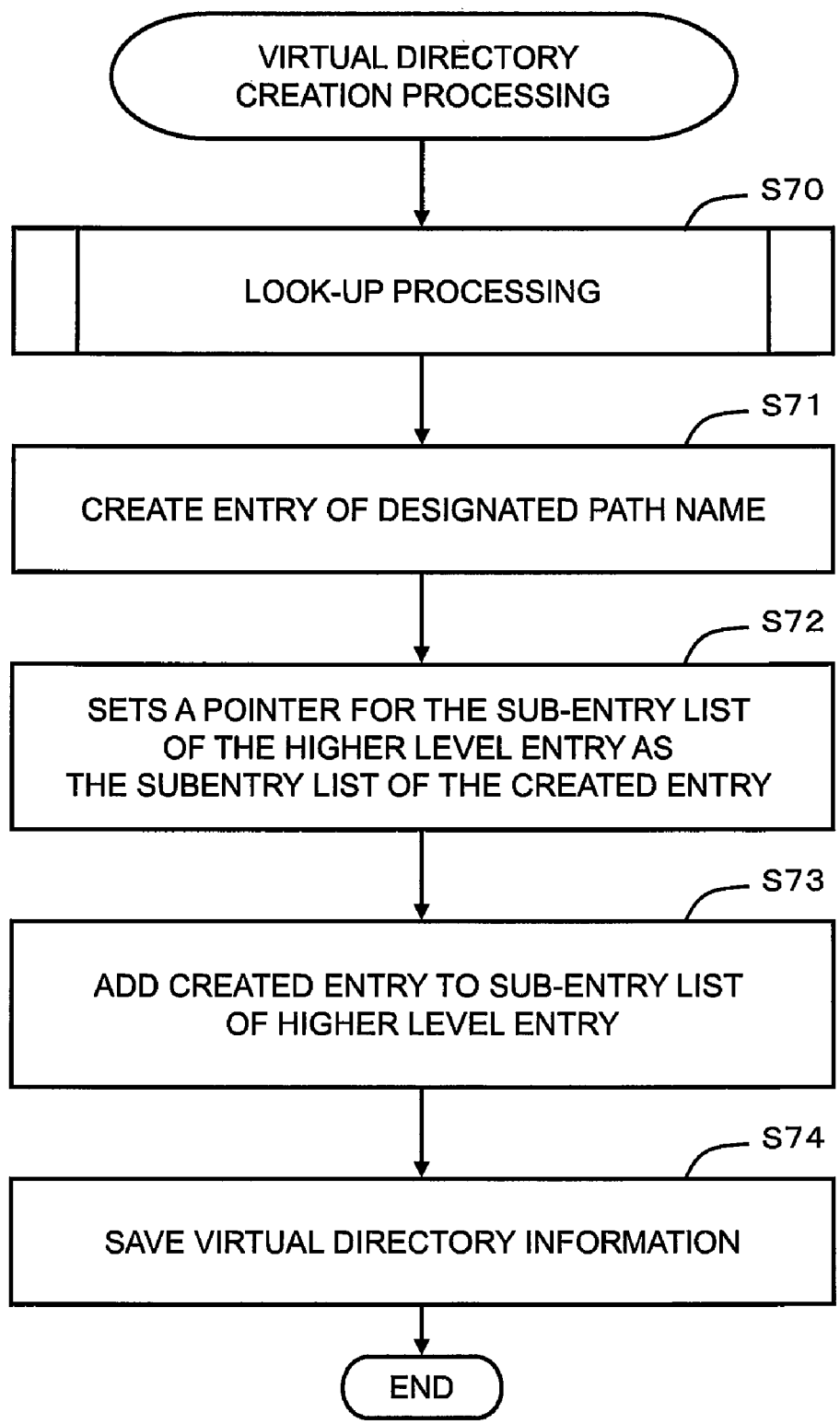
FIG. 14 is a flowchart showing a process for creating the virtual directory.

FIG. 14 shows a process for creating a virtual directory. The first controller 11 executes the look-up process when the management program 401 of the management server 40 issues a command for creating a virtual directory (S70).

The first controller 11 creates the entry information 1411 of the path name designated by the path name designating module 4012 of the management screen 4011 (S71). The first controller 11 sets a pointer for pointing at the subentry list 14111 of the higher level entry as the subentry list 14111 possessed by the entry information 1411 of the virtual directory created in step S71 (S72).

In other words, a link for accessing an entry located immediately below the virtual directory is provided to the subentry list 14111 of the virtual directory. This allows the user to deal with a situation where the name of the file or directory located below the virtual directory is rewritten from the normal directory tree side. If the independent subentry list 14111 is created within the entry information 1411 of the virtual directory, the user cannot respond to such name change when the file name or the like is rewritten from the directory tree side. In this embodiment, as the subentry list 14111 of the virtual directory, the subentry list 14111 of the higher level entry of the virtual directory is used. Therefore, when the path name of the file or the path name of the directory under the virtual directory is changed in the directory tree side, access can be made with the changed file name or folder name. However, when referring to the subentry list 14111 from the virtual directory, the first controller 11 may not return the entry indicating the virtual directory itself of the subentry list 14111, in order to recursively prevent the occurrence of access from a virtual directory to a virtual directory.

The first controller 11 adds the entry name of the created virtual directory to the subentry list 14111 of the higher level entry (S73). Finally, the first controller 11 creates and saves the virtual directory information 1421 (S74).

Figure 15:
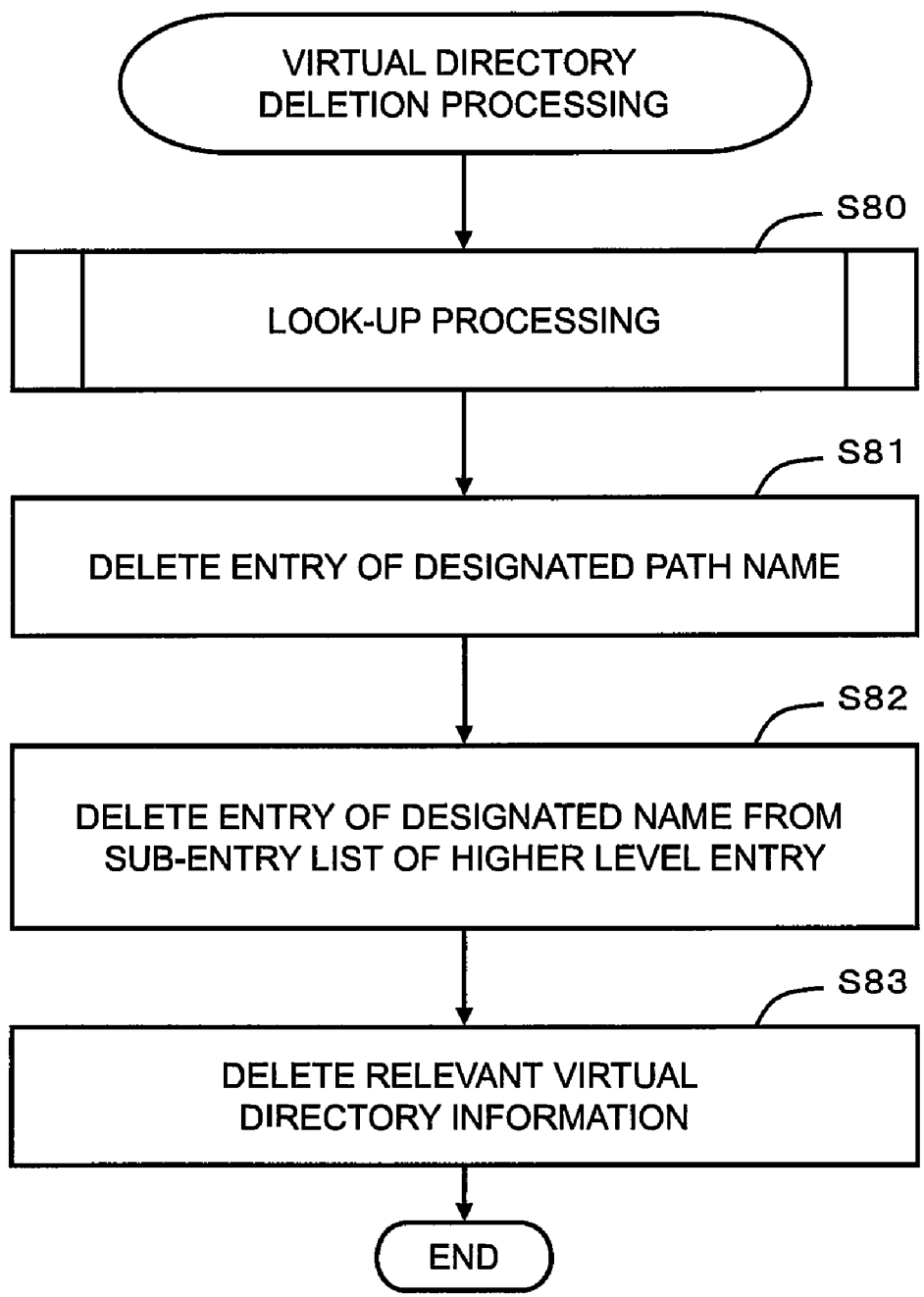
FIG. 15 is a flowchart showing a process for deleting the virtual directory.

FIG. 15 shows the process for deleting a virtual directory. The first controller 11 executes the look-up process when the management program 401 issues a command for deleting a virtual directory (S80). The first controller 11 deletes the entry information 1411 of a designated virtual directory (S81).

The first controller 11 deletes the name of the virtual directory from the subentry list 14111 possessed by the higher level entry of the deleted virtual directory (S82). The first controller 11 further deletes the virtual directory information 1421 corresponding to the deleted virtual directory.

This embodiment with such configurations can provide the virtual directory tree that is different from the normal directory tree in terms of the operations of the file system programs (the look-up processing module 1414 and the like). Thus, only the files and directories that actually belong to the designated tier can be displayed by using the virtual directory tree. As a result, the stubbed file can be distinguished from the file that is not stubbed, on the file servers' side.

FIG. 16 is an explanatory diagram that schematically shows an example of the function effects obtained by this embodiment. FIG. 16(a) shows the normal directory tree. FIG. 16(b) shows a directory tree added with the virtual directory tree. The file data of "file02" and "file03" are stored in the second volume 22. In other words, "file02" and "file03" are the stubbed files in the name space of the first volume 12.

As shown in FIG. 16(a), the normal directory tree shows both the actual file that is not stubbed (file01) and the stubbed files (file02, file03). Therefore, the client computer can carry out a process for checking the computer viruses on the actual file that is not stubbed and the stubbed files.

As shown in FIG. 16(b), the virtual directory tree is provided separately from the normal directory tree. In the illustrated example, the virtual directory (tier1) is provided immediately below "/mnt," but the place for setting the virtual directory is not limited thereto. For example, the virtual directory may be inserted immediately below "dir01" lower than "/mnt."

A tree that has basically the same structure as the corresponding normal directory tree is generated under the virtual directory. However, the stubbed files are not displayed, as described above. Hence, the virtual directory tree and the normal directory tree corresponding to the position of the virtual directory are same except that the stubbed files are not displayed in the virtual directory tree.

Note that although this examples mentioned the effects obtained when the tier 1 is designated, the same effects are obtained when the lower level tier or other tier is designated.

Embodiment 2

The second embodiment is described with reference to FIGS. 17 and 18. This embodiment corresponds to a modification of the first embodiment. Thus, the differences between the first embodiment and the second embodiment are mainly described. In this embodiment, although the stubbed files are displayed in the virtual directory, the recall process is prevented from occurring.

Figure 17:
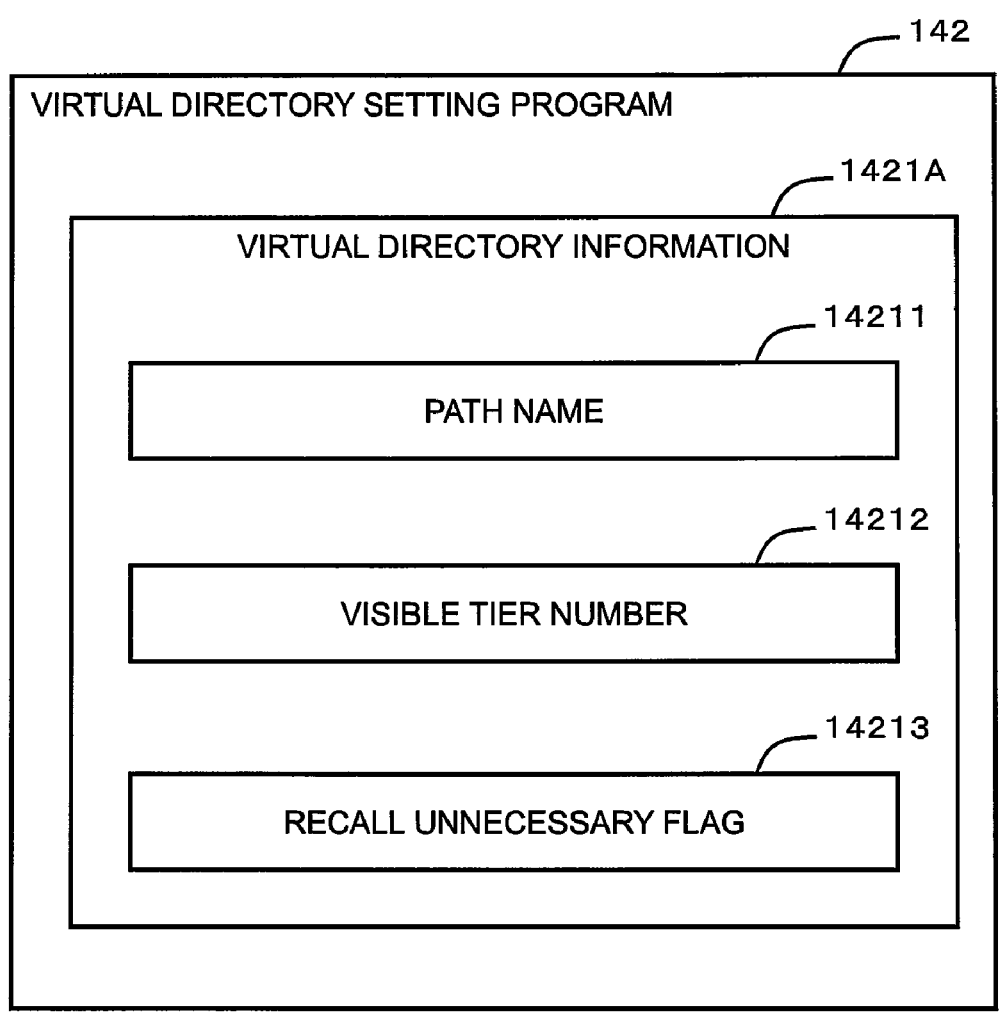
FIG. 17 is a diagram showing a configuration of a virtual directory setting program according to a second embodiment.

FIG. 17 shows a configuration of the virtual directory setting program 142. Virtual directory information 1421A of this embodiment is provided with the path name 14211, and a recall unnecessary flag 14213.

The recall unnecessary flag 14213 is the information indicating that the recall process does not have to be performed on the stub files. Specifically, the recall unnecessary flag 14213 is the control information for preventing the occurrence of the recall process when the stub files are selected as the target to be processed.

Note that the virtual directory information 1421A may be stored in the memory 14 or higher level volume 12 outside the virtual directory setting program.

Figure 18:
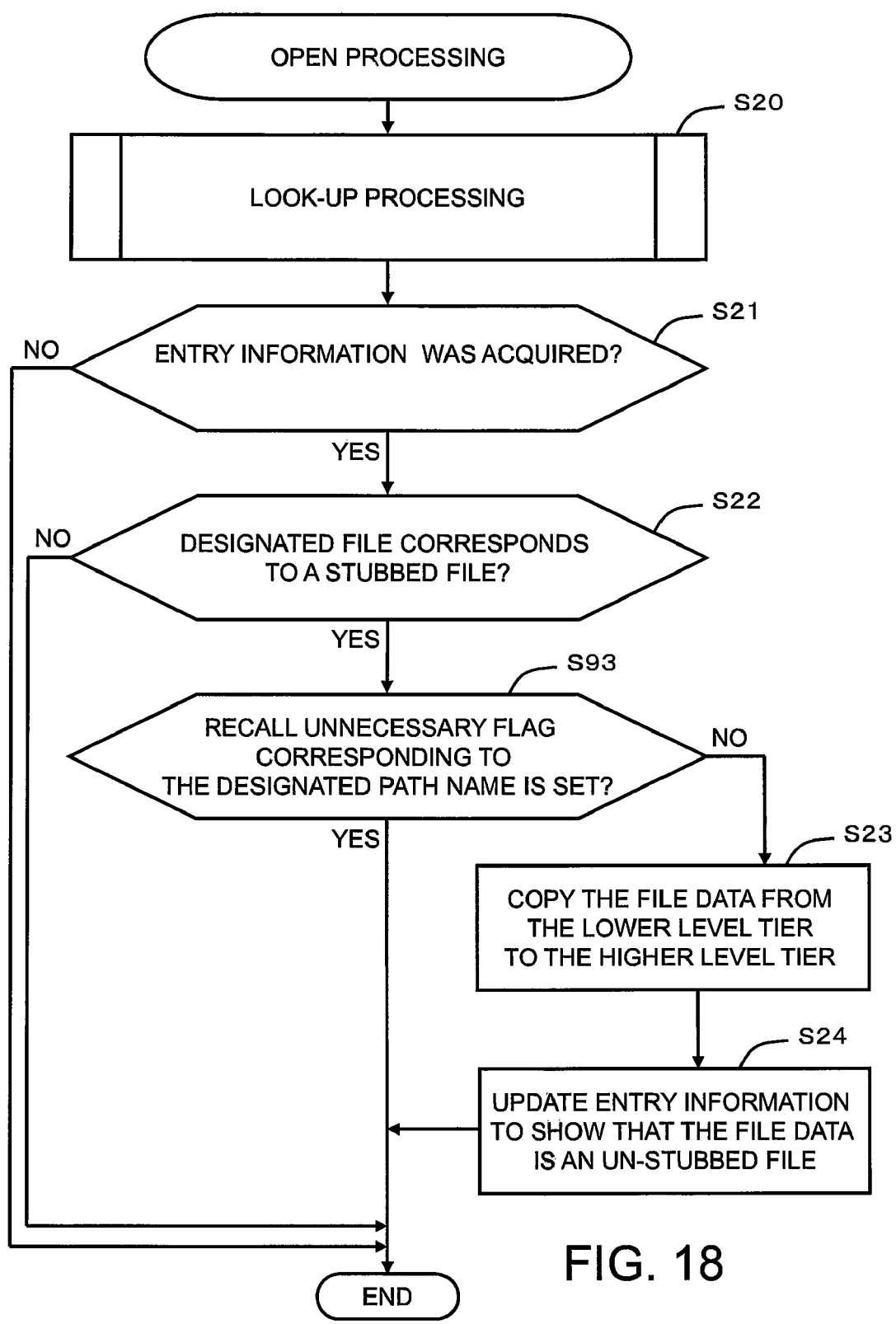
FIG. 18 is a flowchart of an open process according to the second embodiment.

FIG. 18 shows the open process according to this embodiment. The difference between this diagram and FIG. 8 is that determination performed in S93 is added. The step S93 is described hereinafter.

The first controller 11 selects the virtual directory information 1421A corresponding to the name of the virtual directory included in the path name of the file designated in the open process, and determines whether the recall unnecessary flag 14213 of the selected virtual directory information 1421A is set or not. As a result of the determination in S93, when the recall unnecessary flag is set, the recall process is omitted and the open process is ended. If not, S23 is executed. When the virtual directory is not included in the path name as a result of S93, it is considered that the recall unnecessary flag is not set, and S23 is executed.

Note that selecting the virtual directory information 1421A in S93 can be realized by comparing the designated path name with each of the path names 14211 of the virtual directory information 1421, which can be more than one.

In this embodiment, although the stubbed files are displayed in the virtual directory tree, the file data stored in the lower level tier can be accessed while preventing the recall process from being carried out at the time of the open process. Therefore, the occurrence of an unnecessary recall process can be prevented. As a result, the load on each of the file servers 10, 20 can be reduced, and the first volume 12 can be used efficiently.

Of course, Embodiment 1 and Embodiment 2 can be combined together. As a specific example, the process for preventing the recall process of Embodiment 2 to be performed may be combined when designating the lower level tier as the tier designated in Embodiment 1.

When accessing the files via the virtual directory provided in Embodiment 1 and Embodiment 2, the last access time of the meta-information 14114 may or may not be updated.

When a request for inquiring about the free space or used space is received from the client computer by the higher level controller 11, the higher level controller 11 may execute, with respect to the free space or used space, any one of or all of (a) returning the space for the higher level volume 12, (b) returning the space for the lower level volume 22, and (c) returning the space obtained by adding both of these spaces. Especially in the present embodiment because the directory provided to the client computer has the virtual directory tree exists in addition to a normal tree, simply adding the file size on the client computer side generates a file with a duplicate space, which is not preferred from the perspective of space management.

Embodiment 1 and Embodiment 2 complement each other. Therefore, the higher level file server 10 may switch the setting of the predetermined virtual directory between Embodiment 1 and Embodiment 2 by allowing the management server 4 to receive the setting of the virtual directory input by the manager of the file storage system, and by transmitting this setting to the higher level file server 10. For example, when only a file whose file data exist in the higher level tier in the setting of Embodiment 1 is selected and provided to the predetermined virtual directory, the file, the time of access to which has elapsed since the generation or update, can be eliminated from the targets to be subjected to crawling process. On the other hand, when the tier descent process is performed due to the shortage of the capacity of the higher level volume 12, the file whose last access time is not so long ago is not provided under the virtual directory tree and therefore cannot be subjected to the crawling process. In the case of the virtual directory of Embodiment 2, the file is provided under the virtual directory tree, regardless of the type of the tier in which the file data exist.

In a case of a program that realizes the crawling process on the file that is updated after the previous crawling process, when the file is accessed through the virtual directory of Embodiment 2, the information acquisition process needs to be performed on the stubbed file, but the number of times the recall process is carried out is small or almost zero.

Note that the recall processes described in Embodiment 1 and Embodiment 2 are carried out based on the request for accessing the file in which the file data need to be read or written (data addition, data update, data reference, for example). When file opening or information acquisition requesting is not necessary, it is better that the file data be not read or written to use the space efficiency. However, the recall process may be carried out based on a request that does not demand the reading or writing of the file data.

Although the current time is used in the tier descent process described in Embodiment 1 and Embodiment 2, the current time does not have to be an accurate time distributed by an NTP server or the like, because current times indicated by a plurality of computers slightly vary from one another. The current time, therefore, may be any of the times shown by the computers as long as it is the time indicated by each c. The path name thus explained may be referred to as a relative path name, in addition to the path name that is absolute in the network file system.

As the identifier used when accessing a file from the client computer that is an alternative for the virtual directory, an IP address having a value different from that of the normal directory tree, or the export name of the network file system (network drive name) may be provided. It is particularly preferred to perform this when the client computer counts the storage capacity in use by counting the sizes of the files provided by the higher level file server 11. It goes without saying that the various processes described in Embodiment 1 and Embodiment 2 are operated if the higher level file server has the correspondence relationship between the identifier, which is an alternative for the virtual directory, and the normal directory tree. In this case, in a case of the processes shown in FIGS. 9 and 10, for example, the alternative identifier may be used as the basis for performing the determination in S30, and the process for eliminating the virtual directory name performed in S31 may be omitted.

The management screen shown in the FIG. 13 for the Embodiment 2 may be set/unset/view the recall unnecessary flag 14213, And If files in all of the tiers are provided in the virtual directory, set/unset of the visible tier shown in FIG. 13 may be omitted. According to the above embodiment, we disclosed a computer system comprising: a file access controller; a first storage device storing first file data of a first file; a second storage device storing second file data of a second file, which is moved from the first storage device by the file access controller based on a predetermined moving condition; and at least one client computer sending access requests of the first file and the second file. Wherein the file access controller stores configuration information about a virtual directory tree and provides a normal directory tree and the virtual directory tree to the at least one client computer based on the configuration information, wherein the file access controller provides the first file to the at least one client computer through both of the normal directory tree and the virtual directory tree, and wherein, based on the configuration information, the file access controller switches providing of the second file to the at least one client computer, depending on a used directory tree, which is used by the at least one client computer, and which is the normal directory tree or the virtual directory tree. Further, in case of the used directory tree being the normal directory tree, the file access controller may provide the second file to the at least one client computer, as the providing of the second file, and in case of the used directory tree being the virtual directory tree, the file access controller may prevent to provide the second file to the at least one client computer, as the providing of the second file.

Further, in case of the used directory tree being the normal directory tree, the file access controller may send all or part of the second file data to the at least one client computer with storing all or part of the second file data in the first storage device, for a read request included in the access requests, and wherein, in case of the used directory tree being the virtual directory tree, the file access controller may send all or part of the second file data to the at least one client computer with preventing to store all or part of the second file data in the first storage device, for a read request included in the access requests.

Further, one of the at least one client computer may execute a crawling process using the virtual directory tree. And the file access controller may receive input about the virtual directory tree, and updates the configuration information. And, wherein, as the prevention to provide the second file, the file access controller may: (A) create output information including attributes of the first file indicated by meta-information of the first file, with preventing to include attributes of the second file indicated by meta-information of the second file, and send the output information as a response to a attribute acquisition request included in the access requests; and/or (B) reject a file access request of the second file using the virtual directory tree, which is included in the access requests, wherein the file access request includes: a open request of the second file; a read request of the second file; or a write request of the second file.

Further, a export name or IP address or port number corresponding to the normal directory tree may be different to a export name or IP address or port number corresponding to the virtual directory tree. And the file access controller may send correspondence information between the normal directory tree and the virtual directory tree.

In the standpoint of the computer-readable medium, we also disclosed a computer-readable media for a file access controller, comprising: (1) a file data storing code causing the file access controller to store first file data of a first file and second file data of a second file in a first storage device coupled to the file access controller; (2) a file moving code causing the file access controller to move the first file data from the first storage device to the second storage device, based on a predetermined moving condition; (3) an access request receiving code causing the file access controller to receive access requests of the first file and the second file; (4) a first configuration code causing the file access controller to provide a normal directory tree; (5) a second configuration code causing the file access controller to store configuration information about a virtual directory tree including a correspondence to the normal directory tree; (6) a first providing code causing the file access controller to provides the first file to at least one client computer through both of the normal directory tree and the virtual directory tree; and (7) a second providing code causing the file access controller to switch providing of the second file to the at least one client computer, depending on a used directory tree, which is used by the at least one client computer, and which is the normal directory tree or the virtual directory tree.

One example of the above embodiment discloses A file access controller comprising: (1) an interface coupled to a first storage device, a second storage device, and at least one client computer, and receiving access requests of a first file and a second file; (2) a memory storing configuration information about a virtual directory tree; and (3) a CPU storing first file data of the first file and second file data of the second file in the first storage device, and moving the second file data from the first storage device to the second storage device. Wherein the CPU provides a normal directory tree and the virtual directory tree to the at least one client computer, based on the configuration information, wherein the CPU provides the first file to the at least one client computer through both of the normal directory tree and the virtual directory tree, wherein, based on the configuration information, the CPU provides the second file to the at least one client computer through the normal directory tree, and wherein, based on the configuration information, the CPU prevents to provide the second file to the at least one client computer through the virtual directory tree.

Another example of the above embodiment discloses a file access management method and a file access controller, comprising: (1) storing first file data of a first file and second file data of a second file to a first storage device coupled to the file access controller; (2) moving the first file data from the first storage device to the second storage device, based on a predetermined moving condition; (3) receiving access requests of the first file and the second file; (4) providing a normal directory tree; (5) storing configuration information about a virtual directory tree including a correspondence to the normal directory tree; (6) providing the first file to at least one client computer through both of the normal directory tree and the virtual directory tree; (7) sending all or part of the second file data to the at least one client computer with storing all or part of the second file data to the first storage device, for a read request included in the access requests; and (8) sending all or part of the second file data to the at least one client computer with preventing to store all or part of the second file data to the first storage device, for a read request included in the access requests.

It should be noted that the present invention is not limited to the embodiments described above. Those skilled in the art can make various additions and modifications within the scope of the present invention. For example, in Embodiment 1 and Embodiment 2, the information according to the present invention by using such expressions as "aaa table," "aaa list," "aaa DB," and "aaa cue," but these information may be expressed in different forms other than the data structures such as a table, list, DB and cue. Therefore, "aaa table," "aaa list," "aaa DB," and "aaa cue" are often called "aaa information," to explain that the information are not dependent on the data structures. In addition, when explaining the detail of each information, such expressions as "identification information," "identifier," "name," "name," and "ID" are used, and these are replaceable with each other.

REFERENCE SIGNS LIST

1: Higher level file server
1A: First volume
1B: Input/output processing module
1C: File searching module
1D: File moving module
1E: Tier directory setting module
2: Lower level file server
2A: Second volume
3: Application server
3A: Application program
4: Management server
4A: Management program
6a, 6b: Communication network
10: Higher level file server
20: Lower level file server
30: Application server
40: Management server
50: User computer
141: Name space configuration program
142: Virtual directory setting program
341, 342: Application program
401: File server management program
501: File access program
61, 62: Communication network

The invention claimed is:

1. A computer system, comprising:
a file access controller;
a first storage device storing first file data of a first file;
a second storage device storing second file data of a second file, which is moved from the first storage device by the file access controller based on a predetermined moving condition; and
at least one client computer sending access requests of the first file and the second file,
wherein the file access controller stores configuration information about a virtual directory tree and provides a normal directory tree and the virtual directory tree to the at least one client computer based on the configuration information,
wherein the file access controller provides the first file to the at least one client computer through both of the normal directory tree and the virtual directory tree,
wherein, based on the configuration information, the file access controller switches providing of the second file to the at least one client computer, depending on a used directory tree, which is used by the at least one client computer, and which is the normal directory tree or the virtual directory tree,
wherein, in case of the used directory tree being the normal directory tree, the file access controller provides the second file to the at least one client computer, as the providing of the second file, and
wherein, in case of the used directory tree being the virtual directory tree, the file access controller prevents to provide the second file to the at least one client computer, as the providing of the second file.

2. The computer system according to claim 1,
wherein one of the at least one client computer executes a crawling process using the virtual directory tree.

3. The computer system according to claim 2,
wherein the file access controller receives input about the virtual directory tree, and updates the configuration information.

4. The computer system according to claim 3,
wherein, as the prevention to provide the second file, the file access controller:
(A) creates output information including attributes of the first file indicated by meta-information of the first file, with preventing to include attributes of the second file indicated by meta-information of the second file, and sends the output information as a response to a attribute acquisition request included in the access requests.

5. The computer system according to claim 4,
wherein, as the prevention to provide the second file, the file access controller:
(B) rejects a file access request of the second file using the virtual directory tree, which is included in the access requests, and
wherein the file access request includes:
an open request of the second file;
a read request of the second file; or
a write request of the second file.

6. The computer system according to claim 5,
wherein a export name or IP address or port number corresponding to the normal directory tree is different to a export name or IP address or port number corresponding to the virtual directory tree.

7. The computer system according to claim 6,
wherein an identifier of the virtual directory tree includes information specifying the second storage device.

8. The computer system according to claim 7,
wherein the file access controller sends a correspondence information between the normal directory tree and the virtual directory tree.

9. A computer system, comprising:
a file access controller;
a first storage device storing first file data of a first file;
a second storage device storing second file data of a second file, which is moved from the first storage device by the file access controller based on a predetermined moving condition; and
at least one client computer sending access requests of the first file and the second file,
wherein the file access controller stores configuration information about a virtual directory tree and provides a normal directory tree and the virtual directory tree to the at least one client computer based on the configuration information,
wherein the file access controller provides the first file to the at least one client computer through both of the normal directory tree and the virtual directory tree,
wherein, based on the configuration information, the file access controller switches providing of the second file to the at least one client computer, depending on a used directory tree, which is used by the at least one client computer, and which is the normal directory tree or the virtual directory tree,
wherein, in case of the used directory tree being the normal directory tree, the file access controller sends all or part of the second file data to the at least one client computer with storing all or part of the second file data in the first storage device, for a read request included in the access requests, and
wherein, in case of the used directory tree being the virtual directory tree, the file access controller sends all or part of the second file data to the at least one client computer with preventing to store all or part of the second file data in the first storage device, for a read request included in the access requests.

10. The computer system according to claim 9,
wherein one of the at least one client computer executes a crawling process using the virtual directory tree.

11. A file access management method, comprising the steps of:
storing first file data of a first file and second file data of a second file in a first storage device coupled to a file access controller;
moving the first file data from the first storage device to the second storage device, based on a predetermined moving condition;
receiving access requests of the first file and the second file with the file access controller and storing configuration information about a normal directory tree and a virtual directory tree, including a correspondence to the normal directory tree;
providing the first file to at least one client computer through both of the normal directory tree and the virtual directory tree;
switching to providing the second file to the at least one client computer, depending on a used directory tree, which is used by the at least one client computer, and which is the normal directory tree or the virtual directory tree;
providing the second file to the at least one client computer, in case of the used directory tree being the normal directory tree; and preventing the providing of the second file to the at least one client computer, in case of the used directory tree being the virtual directory tree.

12. A file access management method, comprising the steps of:
    storing first file data of a first file and second file data of a second file in a first storage device coupled to a file access controller;
    moving the first file data from the first storage device to the second storage device, based on a predetermined moving condition;
    receiving access requests of the first file and the second file with the file access controller and storing configuration information about a normal directory tree and a virtual directory tree, including a correspondence to the normal directory tree;
    providing the first file to at least one client computer through both of the normal directory tree and the virtual directory tree;
    switching to providing the second file to the at least one client computer, depending on a used directory tree, which is used by the at least one client computer, and which is the normal directory tree or the virtual directory tree;
    sending all or part of the data of the second file to the at least one client computer and storing all or part of the second file data in the first storage device, for a read request included in the access requests, in case of the used directory tree being the normal directory tree; and
    sending all or part of the second file data to the at least one client computer and preventing the storing of all or part of the second file data in the first storage device, for a read request included in the access requests.

13. A file access controller connected to a first storage device and a second storage device and to at least one client computer, comprising:
    a processor for storing first file data of a first file to the first storage device and for storing second file data of a second file to the second storage device, and for moving the second file data of the second file from the first storage device to the second storage device based on a predetermined moving condition;
    an interface for receiving access requests of the first file and the second file from the at least one client computer;
    a memory for storing configuration information about a virtual directory tree and providing a normal directory tree and the virtual directory tree to the at least one client computer based on the configuration information,
    wherein the first file is provided to the at least one client computer through both of the normal directory tree and the virtual directory tree,
    wherein, based on the configuration information, the providing of the second file is switched to the at least one client computer, depending on a used directory tree, which is used by the at least one client computer, and which is the normal directory tree or the virtual directory tree,
    wherein, in case of the used directory tree being the normal directory tree, providing the second file to the at least one client computer, as the providing of the second file, and
    wherein, in case of the used directory tree being the virtual directory tree, providing the file access controller prevents to provide the second file to the at least one client computer, as the providing of the second file.

14. A file access controller connected to a first storage device and a second storage device and to at least one client computer, comprising:
    a processor for storing first file data of a first file to the first storage device and for storing second file data of a second file to the second storage device, and for moving the second file data of the second file from the first storage device to the second storage device based on a predetermined moving condition;
    an interface for receiving access requests of the first file and the second file from the at least one client computer;
    a memory for storing configuration information about a virtual directory tree and providing a normal directory tree and the virtual directory tree to the at least one client computer based on the configuration information,
    wherein the first file is provided to the at least one client computer through both of the normal directory tree and the virtual directory tree,
    wherein, based on the configuration information, the providing of the second file is switched to the at least one client computer, depending on a used directory tree, which is used by the at least one client computer, and which is the normal directory tree or the virtual directory tree,
    wherein, in case of the used directory tree being the normal directory tree, the file access controller sends all or part of the second file data to the at least one client computer and stores all or part of the second file data in the first storage device, for a read request included in the access requests, and
    wherein, in case of the used directory tree being the virtual directory tree, the file access controller sends all or part of the second file data to the at least one client computer and prevents the storing of all or part of the second file data in the first storage device, for a read request included in the access requests.

* * * * *